US011962074B2

(12) United States Patent
Wei et al.

(10) Patent No.: US 11,962,074 B2
(45) Date of Patent: Apr. 16, 2024

(54) MULTI-BAND ANTENNA ARCHITECTURES FOR A WEARABLE DEVICE AND RELATED DEVICES AND METHODS

(71) Applicant: META PLATFORMS TECHNOLOGIES, LLC, Menlo Park, CA (US)

(72) Inventors: Yonghua Wei, San Diego, CA (US); Geng Ye, Union City, CA (US); Bruno Cendon Martin, Palo Alto, CA (US); Roustem Galeev, Lund (SE); Oliver Francis Llewelyn Collis, Skane (SE)

(73) Assignee: Meta Platforms Technologies, LLC, Menlo Park, CA (US)

( * ) Notice: Subject to any disclaimer, the term of this patent is extended or adjusted under 35 U.S.C. 154(b) by 13 days.

(21) Appl. No.: 17/687,158

(22) Filed: Mar. 4, 2022

(65) Prior Publication Data

US 2023/0282965 A1 Sep. 7, 2023

(51) Int. Cl.
*H01Q 1/27* (2006.01)
*H01Q 1/48* (2006.01)
*H01Q 13/10* (2006.01)

(52) U.S. Cl.
CPC ............... *H01Q 1/273* (2013.01); *H01Q 1/48* (2013.01); *H01Q 13/103* (2013.01)

(58) Field of Classification Search
CPC .......... H01Q 1/273; H01Q 1/48; H01Q 13/10; H01Q 13/18; H01Q 1/243; G04R 60/06; G04R 60/08
See application file for complete search history.

(56) References Cited

U.S. PATENT DOCUMENTS 7,183,982 B2 * 2/2007 Kadambi ............... H01Q 5/371 343/702
7,482,991 B2 * 1/2009 Boyle .................. H01Q 9/0442 343/767
10,355,344 B1 7/2019 Ruaro et al.
2011/0102274 A1 * 5/2011 Fujisawa ................ G04R 60/10 343/702
2017/0192396 A1 * 7/2017 Matsuzaki ........... H04B 1/1607
2017/0237459 A1 8/2017 Kim et al.
(Continued)

FOREIGN PATENT DOCUMENTS

CN 112366444 A 2/2021

OTHER PUBLICATIONS

International Search Report and Written Opinion for International Application No. PCT/US2023/014327, dated Jun. 9, 2023, 17 pages.

*Primary Examiner* — A B Salam Alkassim, Jr.
*Assistant Examiner* — Leah Rosenberg
(74) *Attorney, Agent, or Firm* — Greenberg Traurig, LLP

(57) ABSTRACT

The disclosed mobile electronic device may include a display, an enclosure supporting the display and comprising a conductive portion including at least one inward protrusion, and a ground plane positioned within the enclosure and comprising at least one channel, wherein the at least one inward protrusion extends within the at least one channel of the ground plane and a gap defined between the conductive portion of the enclosure and the ground plane forms a slot antenna that is configured to radiate electromagnetic signals through a portion of the display. Various other related methods and systems are also disclosed.

20 Claims, 18 Drawing Sheets

(56) References Cited

U.S. PATENT DOCUMENTS

| | | | | |
|---|---|---|---|---|
| 2019/0198984 | A1* | 6/2019 | Han | H04B 1/385 |
| 2019/0260116 | A1* | 8/2019 | Wei | H02J 7/02 |
| 2020/0365974 | A1* | 11/2020 | Wei | H01Q 9/42 |
| 2023/0282962 | A1* | 9/2023 | Wei | G04G 17/04 |
| | | | | 343/700 R |

* cited by examiner

MULTI-BAND ANTENNA ARCHITECTURES FOR A WEARABLE DEVICE AND RELATED DEVICES AND METHODS

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
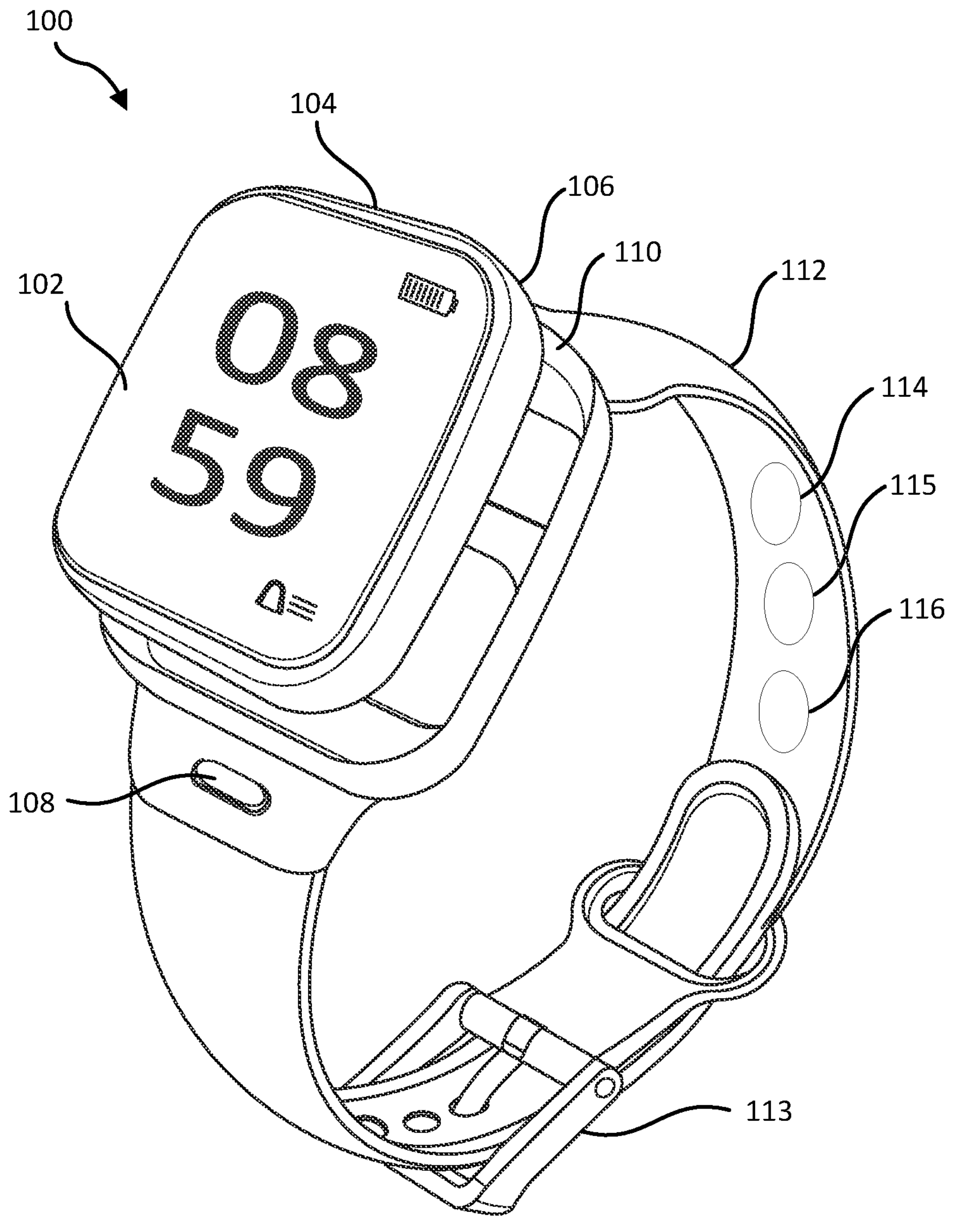
FIG. 1 is a perspective view of an example wristband system, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Wearable devices may be configured to be worn on a user's body part, such as a user's wrist, arm, leg, torso, neck, head, finger, etc. Such wearable devices may be configured to perform various functions. For example, a wristband system may be an electronic device worn on a user's wrist that performs functions such as delivering content to the user, executing social media applications, executing artificial-reality applications, messaging, web browsing, sensing ambient conditions, interfacing with head-mounted displays, monitoring a health status of the user, etc. Many of the functions of the wearable device may require wireless communications to exchange data with other devices, servers, etc. However, the compact size of wearable devices may restrict the physical dimensions of antennas and create challenges in antenna architecture and frequency band support that may affect wireless communication performance.

The present disclosure details systems, devices, and methods related to multiband antenna architectures of a mobile electronic device (e.g., a wearable device, a smartwatch, a wristband system, etc.). The antenna architecture may include multiple antennas and devices that enable wireless communication for the mobile electronic device. The antennas and devices may include a slot antenna, an extended ground plane, a patch antenna, a trace antenna, a branch antenna, an enclosure antenna, or any combination thereof. The antenna architecture within the wearable device may include a ground plane having channels (e.g., slots) and a conductive enclosure having inward protrusions (e.g., metal tabs). The tabs may be disposed at least partially within the slots to create an interdigitated (e.g., interlocking comb-like) structure. A continuous gap defined between the ground plane and the conductive enclosure around the perimeter of the ground plane may form a slot antenna that is configured to radiate electromagnetic signals. The gap may meander between the enclosure tabs and the ground plane slots in the comb-like structure to effectively increase the length (e.g., physical length and/or electrical length) of the gap. Advantages of embodiments of the present disclosure may include increasing the length of a gap in a slot antenna to create a lower resonant frequency of the slot antenna as compared to a slot antenna without the increased gap length due to the comb-like structure of the enclosure tabs and ground plane slots.

In some embodiments, the wearable device may include an expanded ground plane to further improve wireless communication performance. In some examples, the size of the ground plane may be increased by electrically connecting the ground plane in the wearable device (e.g., a ground plane in a layer of a printed circuit board) to a conductive portion of the wearable device. For example, the wearable device may include a conductive cradle in a watch band that is detachably coupled to the wearable device enclosure. Electromagnetic energy reflected off the ground plane may reinforce the energy from the radiating antenna (e.g., slot antenna). By increasing the effective size of the ground plane, more energy radiated from the slot antenna may be reflected off the larger ground plane, thereby increasing the gain of the slot antenna. The enclosure (e.g., a watch body) may be detachably coupled to the conductive cradle. When the watch body is attached to the conductive cradle, electrical contacts may extend through a lower portion of the watch body to create an electrical connection between the ground plane of the printed circuit board and the conductive watch cradle, thereby effectively increasing the size of the ground plane.

The following will provide, with reference to FIGS. 1-18, detailed descriptions of multiband antenna architectures for wearable devices, as well as related devices and methods. First, a description of a wristband system including a watch band, a watch body, and a method of decoupling the watch body from the watch band is presented with reference to FIG. 1. A description of a user donning a wearable device is presented with reference to FIG. 2. A description of a user holding a watch body detached from a watch band is presented with reference to FIG. 3. A description of a high-level architecture of an example RF circuit is presented with reference to FIG. 4. A description of an RF circuit for driving and tuning multiband antennas in a wearable device is presented with reference to FIG. 5. A description of external features of a watch body is presented with reference to FIGS. 6A and 6B. A description of internal components associated with multiband antenna architectures of wearable devices is presented with reference to FIGS. 7-13. A description of various types of example artificial-reality devices that may be used with a wearable device is presented with reference to FIGS. 14-18.

FIG. 1 illustrates a perspective view of an example wearable device in the form of a wristband system 100 that includes a watch body 104 decoupled from an associated watch band 112. Watch body 104 and watch band 112 may have a substantially rectangular or circular shape and may be configured to allow a user to wear wristband system 100 on a body part (e.g., a wrist). Wristband system 100 may include a retaining mechanism 113 (e.g., a buckle, a hook and loop fastener, etc.) for securing watch band 112 to the user's wrist. Wristband system 100 may also include a coupling mechanism 106 for detachably coupling watch body 104 to watch band 112.

The wristband system 100 may be configured to execute functions, such as, without limitation, displaying visual content to the user (e.g., visual content displayed on display screen 102), sensing user input (e.g., sensing a touch on button 108, sensing biometric data on sensor 114, sensing neuromuscular signals on neuromuscular sensor 115, etc.), messaging (e.g., text, speech, video, etc.), capturing images, determining location, performing financial transactions, providing haptic feedback, performing wireless communications (e.g., Long Term Evolution (LTE), cellular, near field, wireless fidelity (WiFi), Bluetooth™ (BT), personal area network), etc. The wireless communications functions may be executed using a slot antenna, a trace antenna, a patch antenna, a branch antenna, an enclosure antenna(s) or a combination thereof, as described in detail below with reference to FIGS. 2-17.

Wristband system 100 functions may be executed independently in watch body 104, independently in watch band 112, and/or in communication between watch body 104 and watch band 112. Functions may be executed on wristband system 100 in conjunction with an artificial-reality system such as any of the artificial-reality systems described with reference to FIGS. 14-18.

Watch band 112 may be configured to be worn by a user such that an inner surface of watch band 112, an inner surface of watch body 104, and/or watch band coupling mechanism(s) 110 may be adjacent to (e.g., in contact with) the user's skin. Watch band 112 may include multiple sensors 114, 115 that may be distributed on an inside and/or an outside surface of watch band 112. Sensor 114 may be a biosensor that is configured to sense a user's heart rate, saturated oxygen level, temperature, sweat level, muscle intentions, or a combination thereof. Additionally or alternatively, watch body 104 may include the same or different sensors than watch band 112. For example, multiple sensors may be distributed on an inside and/or an outside surface of watch body 104. As described below with reference to FIG. 4, sensor 114 may detect whether watch body 104 is worn by a user (e.g., disposed next to a user's skin) or watch body 104 is away from the user's wrist. An RF tuning circuit and/or a processor may read the status of sensor 114 and tune at least one antenna of watch body 104 to adjust wireless communications settings (e.g., a center frequency) based on whether the user is wearing watch body 104.

Watch body 104 may include, without limitation, a proximity sensor (e.g., a sensor to determine a proximity to a human and/or proximity to watch band 112), a front facing image sensor, a rear-facing image sensor, a biometric sensor, an inertial measurement unit, a heart rate sensor, a saturated oxygen sensor, a neuromuscular sensor, an altimeter sensor, a temperature sensor, a bioimpedance sensor, a pedometer sensor, an optical sensor, a touch sensor, a sweat sensor, or any combination or subset thereof. Sensor 114 may also include a sensor that provides data about a user's environment, such as a user's motion (e.g., with an inertial measurement unit), altitude, location, orientation, gait, or a combination thereof. Watch band 112 may transmit the data acquired by sensor 114 to watch body 104 using a wired communication method (e.g., a UART, a USB transceiver, etc.) and/or a wireless communication method (e.g., near field communication, WiFi, BT, etc.). In some examples, watch body 104 and watch band 112 may each be configured to operate whether watch body 104 is coupled to or decoupled from watch band 112. In some examples, sensor 114 may include a heart rate sensor disposed on a surface (e.g., a rear surface) of watch body 104 as shown with reference to FIGS. 6A and 6B, such that the heart rate sensor detects the proximity of watch body 104 to the skin of the user when the user is wearing watch band 112 and watch body 104.

Watch band 112 and/or watch body 104 may include a haptic device 116 (e.g., a vibratory haptic actuator) that is configured to provide haptic feedback (e.g., a cutaneous and/or kinesthetic sensation, etc.) to the user's skin. Sensor 114 and/or haptic device 116 may be configured to operate in conjunction with multiple applications including, without limitation, health monitoring, social media, game playing, and artificial reality (e.g., the applications associated with artificial reality as described below with reference to FIGS. 14-18).

In some examples, watch band 112 and/or watch body 104 may include a neuromuscular sensor 115 (e.g., an electromyography (EMG) sensor, a mechanomyogram (MMG)

sensor, a sonomyography (SMG) sensor, etc.). Neuromuscular sensor 115 may sense a user's muscle intention. The sensed muscle intention may be transmitted to an artificial-reality (AR) system (e.g., augmented-reality system 1400 of FIG. 14, virtual-reality system 1500 of FIG. 15, head-mounted display 1702 of FIG. 17, or augmented-reality glasses 1820 in FIG. 18) to perform an action in an associated artificial-reality environment, such as to control the motion of a virtual object displayed to the user. Further, the artificial-reality system may provide haptic feedback to the user in coordination with the artificial-reality application via haptic device 116. In some examples, neuromuscular sensor 115 may sense a proximity of watch body 104 to the skin of the user when the user is wearing watch band 112 and watch body 104.

Wristband system 100 may include a coupling mechanism for detachably coupling watch body 104 to watch band 112. A user may detach watch body 104 from watch band 112 in order to reduce the encumbrance of wristband system 100 to the user. Wristband system 100 may include a watch body coupling mechanism(s) 106 and/or watch band coupling mechanism(s) 110 (e.g., a cradle, a tracker band, a support base, a clasp). A user may perform any type of motion to couple watch body 104 to watch band 112 and to decouple watch body 104 from watch band 112. For example, a user may twist, slide, turn, push, pull, or rotate watch body 104 relative to watch band 112, or a combination thereof, to attach watch body 104 to watch band 112 and to detach watch body 104 from watch band 112.

Band coupling mechanism(s) 110 may include a conductive material. When watch body 104 is attached to conductive coupling mechanism(s) 110, electrical contacts may extend through a lower portion of watch body 104 creating an electrical connection between a ground plane of a printed circuit board in watch body 104 and the conductive coupling mechanism(s) 110, thereby effectively increasing the size of the ground plane and increasing a gain of antenna(s) within watch body 104.

Figure 2:
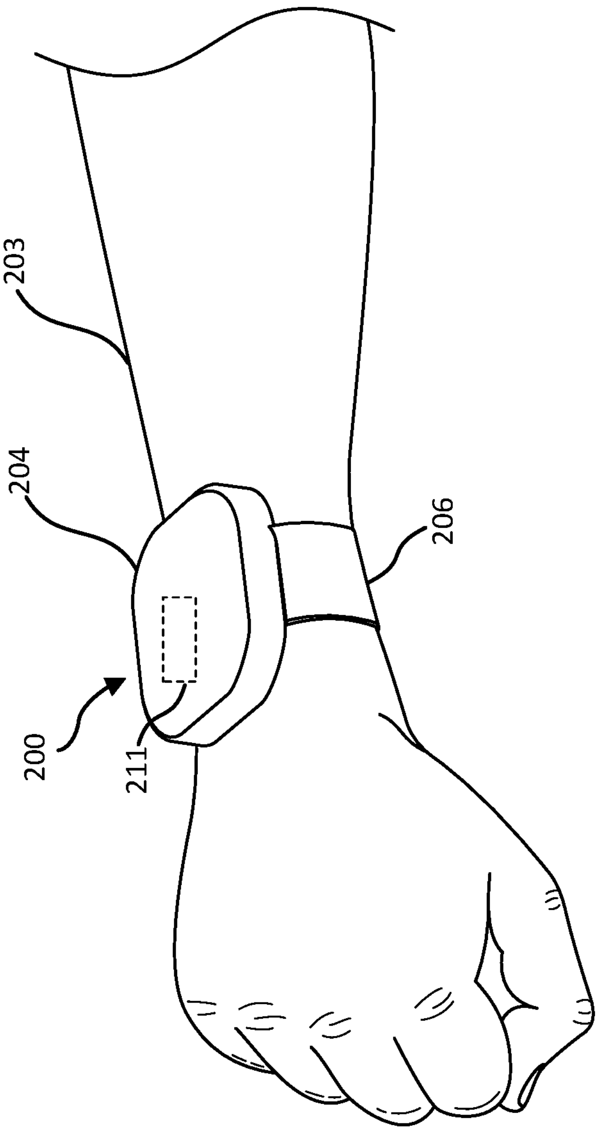
FIG. 2 is a perspective view of a user wearing an example wristband system, according to at least one embodiment of the present disclosure.
Figure 3:
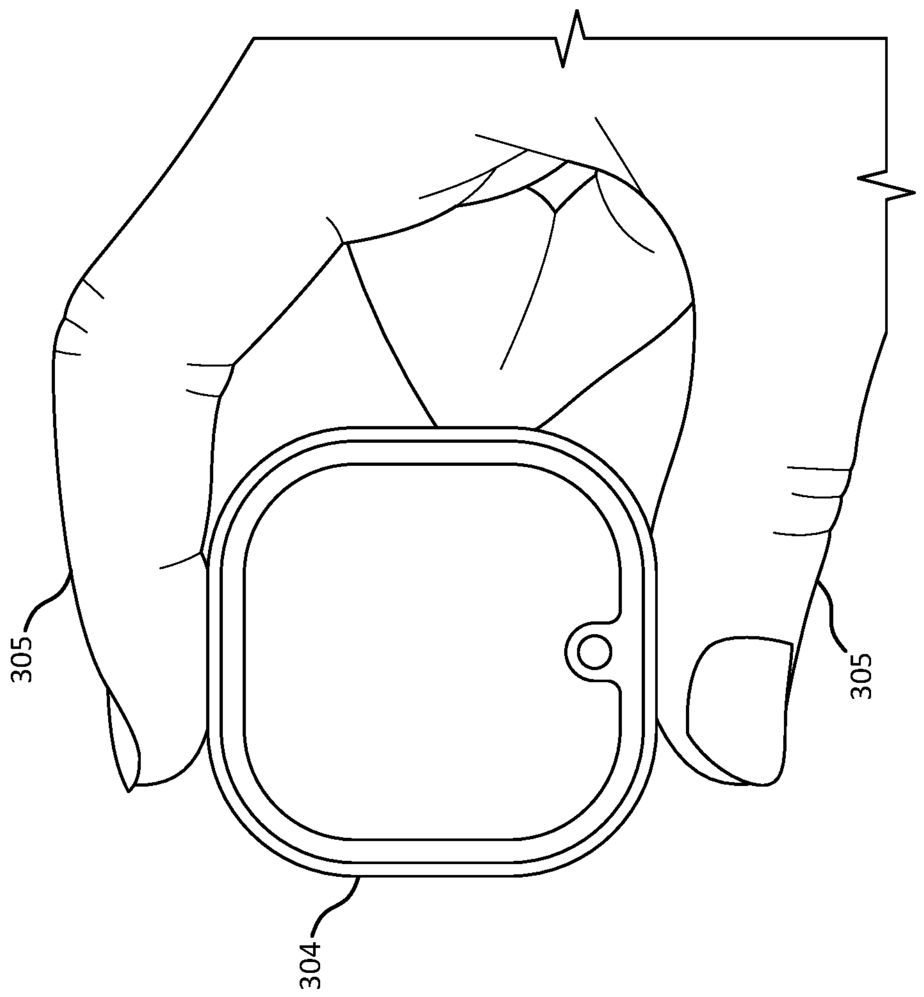
FIG. 3 is a plan view of a user holding a watch body of an example wristband system, according to at least one embodiment of the present disclosure.

FIG. 2 is a perspective view of a user wearing a wristband system 200, according to at least one embodiment of the present disclosure. A user may wear wristband system 200 on any body part. For example, a user may wear wristband system 200 on a forearm 203. The user may operate watch body 204 while wearing wristband system 200 or while watch body 204 is detached as shown in FIG. 3 (e.g., the user detaches watch body 204 from a wristband 206 of wristband system 200 or the user removes wristband system 200 from forearm 203). Watch body 204 may include a wireless communication unit. The performance of the wireless communication unit may depend on the proximity of watch body 204 to the user.

Electromagnetic distortion of the radio waves transmitted and received by watch body 204 may be caused by interaction with human body tissue in a user (e.g., forearm 203 of the user).

Performance of the antenna(s) (e.g., slot antenna, trace antenna, patch antenna, branch antenna, and/or enclosure antenna) operating in close proximity to a user may be degraded or changed due to losses caused by varying electric properties of human tissues, resulting in distortion of the radiation pattern, reduction in radiation efficiency, and/or de-tuning of antenna impedance. As described above with reference to FIG. 1, a proximity sensor (e.g., sensor 114) may determine the proximity of watch body 204 to the user's forearm 203, to the user's skin, and/or to wristband 206. In some examples, watch body 204 may include an RF circuit 211 configured to tune the antenna(s) (e.g., slot antenna, trace antenna, patch antenna, branch antenna, and/or enclosure antenna) to compensate for the performance loss due to the proximity to the user. For example, RF circuit 211 may compensate for the performance loss due to the proximity to the user by matching the impedance of the antenna to the impedance of RF circuit 211. In some examples, a ground plane of watch body 204 may be connected to a conductive portion of wristband 206, thereby effectively increasing the size of the ground plane and increasing a gain of antenna(s) driven by RF circuit 211. Examples of effectively increasing the size of the ground plane are described below with reference to FIGS. 9-13.

FIG. 3 is a plan view of a user holding a watch body 304 of an example wristband system, according to at least one embodiment of the present disclosure. In some examples, a user may detach watch body 304 from a watch band as described above with reference to FIG. 1. The user may hold watch body 304 between user's fingers 305. While holding watch body 304, the user may interface with watch body 304 to perform functions such as delivering content to the user, executing social media applications, taking pictures, executing artificial-reality applications, wirelessly communicating, messaging, web browsing, etc. Many of the functions of watch body 304 may be performed using wireless communications to exchange data with other devices, servers, etc.

Since watch body 304 may operate in multiple environments (e.g., between the user's fingers 305, in the palm of a user, on a surface, attached to a watch band or other accessories (such as a selfie stick, bike mount, etc.), in a user's pocket, etc.) the performance of the wireless communications may be affected by the absorption and/or alteration of the wireless signals depending on the environment and/or proximity to the user. In some examples, watch body 304 may include an RF circuit that is configured to tune the antennas (e.g., slot antenna, trace antenna, patch antenna, branch antenna, and/or enclosure antenna) to compensate for the performance loss due to the environment.

Figure 4:
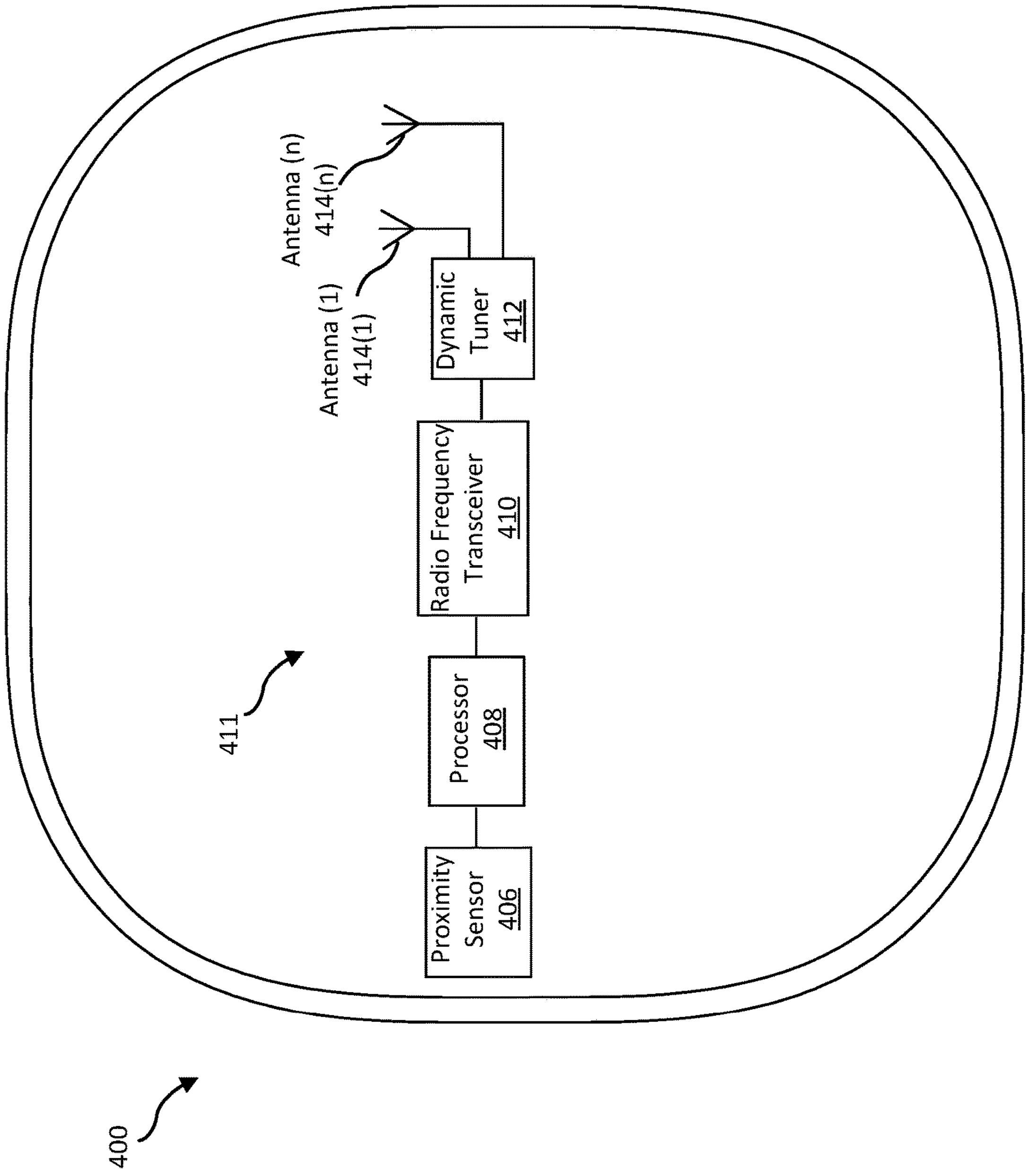
FIG. 4 is a high-level architecture diagram of an example radio frequency circuit of a watch body, according to at least one embodiment of the present disclosure.

FIG. 4 is a high-level architecture diagram of an example RF circuit 411 of a watch body 400. As described above with reference to FIG. 3, watch body 400 may compensate for the environment in which it is operating by tuning one or more antennas to improve the performance of wireless communications. Watch body 400 may include a proximity sensor 406. Proximity sensor 406 may determine a proximity of watch body 400 to a human, to an object or structure (e.g., a table), and/or to a watch band (e.g., watch band 112 of FIG. 1). Watch body 400 may include one or multiple proximity sensors 406. Proximity sensor 406 may be any type of sensor capable of obtaining data for determining whether watch body 400 is coupled to and/or adjacent to another object or device. For example, proximity sensor 406 may include, without limitation, a heart rate monitor sensor, an image sensor, a biometric sensor, an inertial measurement sensor, a saturated oxygen sensor, a neuromuscular sensor, an inductive proximity sensor, an ultrasonic proximity sensor, a mechanical switch or button, a magnetic sensor, or a combination thereof. Watch body 400 may include a processor 408. Processor 408 (e.g., a central processing unit, a microcontroller, MCU 558 of FIG. 5, etc.) may read the output of proximity sensor 406 to determine proximity status.

Processor 408 may provide the proximity status to an RF transceiver 410. In some examples, processor 408 may process baseband signals for the wireless communications. RF transceiver 410 may process and/or convert baseband signals to radio frequency signals for transmitting and/or receiving over the air. RF transceiver 410 may also receive the proximity status from processor 408 and control a dynamic tuner 412 based on the status of the proximity sensor. In additional embodiments, processor 408 may directly control dynamic tuner 412. Dynamic tuner 412 may adjust the center frequency of antennas 414(1) . . . **414(*n*) by adjusting a center frequency of antennas 414(1) . . . 414(*n*) based on the status of the proximity sensor. In some embodiments, dynamic tuner 412 may adjust the center frequency of antennas 414(1) . . . 414(*n*) as described in detail below with reference to FIG. 5**.

Figure 5:
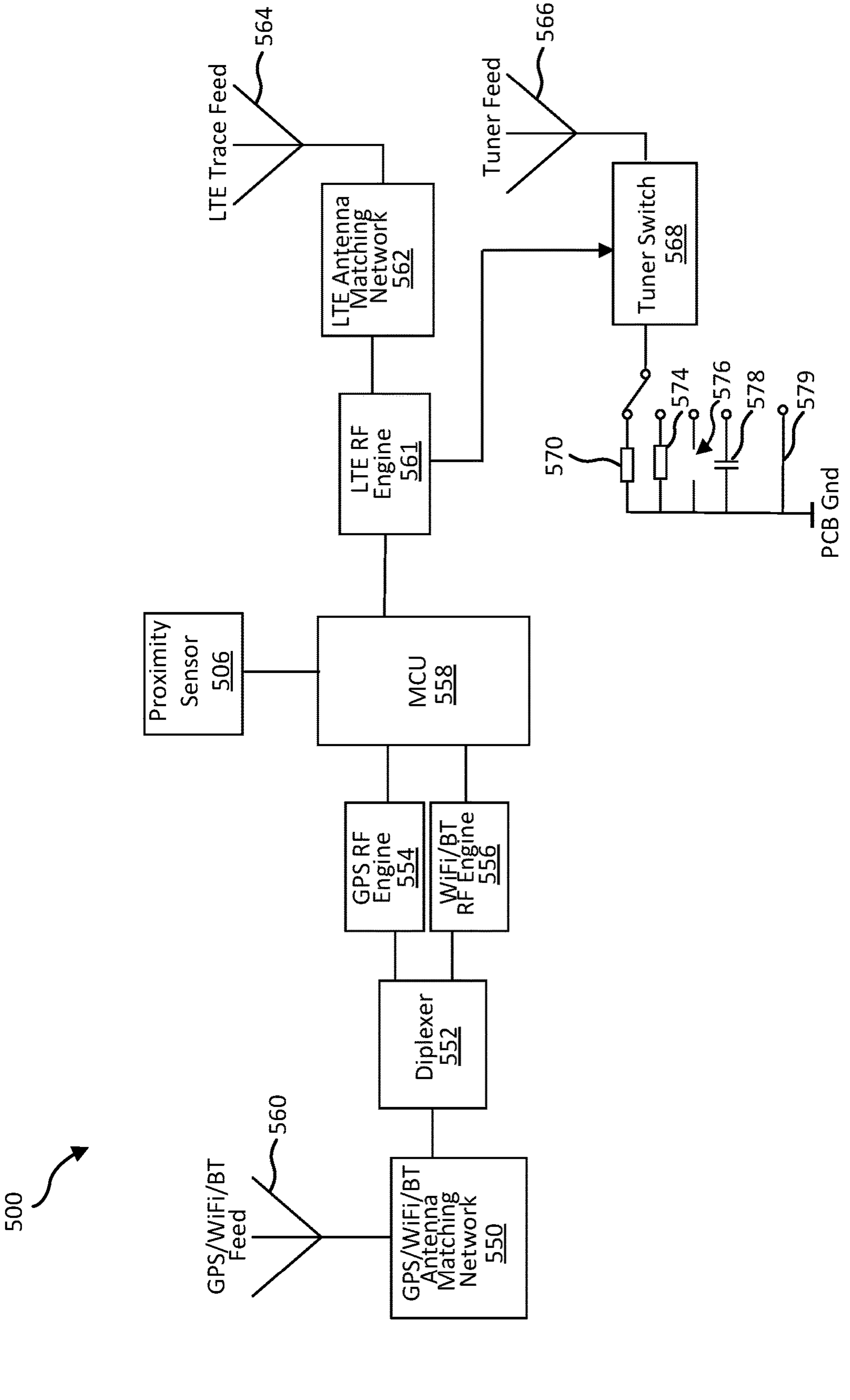
FIG. 5 is a block diagram of an example radio frequency circuit of a watch body, according to at least one embodiment of the present disclosure.

FIG. 5 is a block diagram illustrating an RF circuit 500 of a watch body, according to at least one embodiment of the present disclosure. By way of example, RF circuit 500 may be employed as RF circuit 211 of FIG. 2, RF circuit 411 of FIG. 4, RF circuit 711 of FIG. 7, RF circuit 868 of FIG. 8 and/or RF circuit 968 of FIG. 9. RF circuit 500 may transmit and/or receive RF signals to/from a slot antenna (e.g., slot antenna 407, 707, 727, 807), a patch antenna (e.g., patch antenna 714, 814, 914), a trace antenna (e.g., trace antenna 522, 622), a branch antenna (e.g., branch antenna 1524, 1624), and/or an enclosure antenna (e.g., enclosure antenna 1414, 1415, 1614, 1615). In some examples, slot antenna (e.g., slot antenna 407, 707, 727, 807) and/or enclosure antenna (e.g., enclosure antenna 1415, 1615) may be connected to GPS/WiFi/BT feed 560. GPS/WiFi/BT feed 560 may include a press-fit or other connector to connect the slot and/or enclosure antenna to antenna matching network 550. Antenna matching network 550 may include an impedance transformer comprising inductive and/or capacitive components that are configured to match the impedance of the slot antenna and/or enclosure antenna (e.g., 50 ohms) to the impedance of an RF source (e.g., diplexer 552) driving the slot antenna and/or enclosure antenna. Matching the impedance of the RF source to the impedance of the slot antenna and/or enclosure antenna may improve wireless performance by increasing RF power transfer to the slot antenna and/or enclosure antenna.

In some examples, antenna matching network 550 may be connected to a diplexer 552. Diplexer 552 may be connected to GPS RF engine 554 (e.g., an RF transceiver) and WiFi/BT RF engine 556 (e.g., an RF transceiver). Diplexer 552 may allow GPS RF engine 554 and WiFi/BT RF engine 556 to share a common communications channel with a slot antenna (e.g., slot antenna 407, 807) and/or an enclosure antenna (e.g., enclosure antenna 1415, 1615). Diplexer 552 may include passive devices that implement frequency-domain multiplexing. In some examples, GPS RF engine 554 may operate on a first frequency (e.g., a center frequency of 1575 MHz) while WiFi/BT RF engine 556 may operate on a second frequency (e.g., a center frequency in the range of 2400 MHz to 2500 MHz). Diplexer 552 may be configured to multiplex the RF signals from GPS RF engine 554 and WiFi/BT RF engine 556 to a common channel through antenna matching network 550.

In some examples, the slot antenna and/or enclosure antenna may receive RF signals (e.g., GPS signals) from a satellite. The RF signals from the satellite may pass through GPS/WiFi/BT feed 560, antenna matching network 550, and diplexer 552 to be processed by GPS RF engine 554. GPS RF engine 554 may process the RF signals (e.g., the GPS signals) from multiple satellites and triangulate the RF signals to determine a location of the watch body. GPS RF engine 554 may provide the location information to MCU 558 for use in location-based applications.

In some examples, the slot antenna and/or enclosure antenna may transmit to and/or receive RF signals from an electronic device (e.g., a smartphone, a head-mounted display, an access point, etc.). The RF signals may conform to WiFi and/or BT standards. The RF signals may pass through GPS/WiFi/BT feed 560, antenna matching network 550, and diplexer 552 to be processed by WiFi/BT RF engine 556. WiFi/BT RF engine 556 may process the RF signals to send and/or receive data. WiFi/BT RF engine 556 may send the data to MCU 558 and/or receive the data from MCU 558 for use in data applications associated with the watch body (e.g., social media applications, artificial-reality applications, web browsing, media streaming, voice calls, etc.).

In some examples, a trace antenna (e.g., trace antenna 822, 922), a branch antenna (e.g., branch antenna 1524, 1624) and/or an enclosure antenna (e.g., enclosure antenna 1414, 1415) may be connected to LTE trace feed 564. LTE trace feed 564 may include a press-fit or other connector to connect the trace antenna to LTE antenna matching network 562. LTE antenna matching network 562 may include an impedance transformer comprising inductive and/or capacitive components that match the impedance of the trace antenna (e.g., 50 ohms) to the impedance of an RF source (e.g., LTE RF engine 561) driving the trace antenna. Matching the impedance of the RF source to the impedance of the trace antenna may improve the performance of the trace antenna by increasing RF power transferred to the trace antenna.

In some examples, a trace antenna (e.g., trace antenna 822, 922), a branch antenna (e.g., branch antenna 1524, 1624) and/or an enclosure antenna (e.g., enclosure antenna 1414, 1415) may transmit to and/or receive RF signals from an electronic device (e.g., a cellular base station, a smartphone, a head-mounted display, an access point, etc.). The RF signals may conform to the LTE standards in a frequency range of about 600 MHz to about 2200 MHz, such as about 600 MHz to about 960 MHz and about 1710 MHz to about 2200 MHz. The RF signals may pass through LTE trace feed 564 and LTE antenna matching network 562 to be processed by LTE RF engine 561 (e.g., an RF transceiver). LTE RF engine 561 may process the RF signals to send and/or receive data (e.g., send and/or receive data from the Internet). LTE RF engine 561 may send the data to MCU 558 and/or receive the data from MCU 558 for use in data applications associated with the watch body (e.g., social media applications, artificial-reality applications, web browsing, media streaming, voice calls, etc.).

In some examples, a slot antenna (e.g., slot antenna 707, 727, 807, 1107), a patch antenna (e.g., patch antenna 714, 814, 914), a trace antenna (e.g., trace antenna 822, 922), a branch antenna (e.g., branch antenna 1524, 1624), and/or an enclosure antenna (e.g., enclosure antenna 1414, 1415, 1614, 1615) may be connected to tuner feed 566. Tuner feed 566 may include a press-fit or other connector to connect the patch antenna to tuner switch 568. MCU 558 may receive proximity status from proximity sensor 506 and control tuner switch 568 based on the status of proximity sensor 506. Tuner switch 568 may switch inductive elements, capacitive elements, resistive elements, or any combination thereof in series and/or in parallel with the slot antenna (e.g., slot antenna 707, 727, 807, 1107), patch antenna (e.g., patch antenna 714, 814, 914), trace antenna (e.g., trace antenna 822, 922), branch antenna (e.g., branch antenna 1524, 1624), and/or enclosure antenna (e.g., enclosure antenna 1414, 1415, 1614, 1615). For example, tuner switch 568 may switch inductor 570 in series and/or in parallel with the slot antenna (e.g., slot antenna 707, 727, 807, 1107), patch antenna (e.g., patch antenna 714, 814, 914), trace antenna (e.g., trace antenna 822, 922), branch antenna (e.g., branch antenna 1524, 1624), and/or enclosure antenna (e.g., enclosure antenna 1414, 1415, 1614, 1615).

In some examples, tuner switch 568 may function as an aperture tuner and adjust a center frequency of the patch antenna (e.g., patch antenna 714, 814, 914), by switching the impedance tuning element (e.g., inductor 570, resistor 574, open circuit 576, capacitor 578, or short circuit 579) between the ground plane and the patch antenna (e.g., patch antenna 714, 814, 914).

Tuner switch 568 may switch resistor 574 (e.g., a zero ohm resistor) in series and/or in parallel with the slot antenna (e.g., slot antenna 707, 727, 807, 1107), patch antenna (e.g., patch antenna 714, 814, 914), trace antenna (e.g., trace antenna 822, 922), branch antenna (e.g., branch antenna 1524, 1624), and/or enclosure antenna (e.g., enclosure antenna 1414, 1415, 1614, 1615). Tuner switch 568 may switch open circuit 576 in series and/or in parallel with the slot antenna (e.g., slot antenna 707, 727, 807, 1107), patch antenna (e.g., patch antenna 714, 814, 914), trace antenna (e.g., trace antenna 822, 922), branch antenna (e.g., branch antenna 1524, 1624), and/or enclosure antenna (e.g., enclosure antenna 1414, 1415, 1614, 1615). Tuner switch 568 may switch capacitor 578 in series and/or in parallel with the slot antenna (e.g., slot antenna 707, 727, 807, 1107), patch antenna (e.g., patch antenna 514, 614, 714), trace antenna (e.g., trace antenna 822, 922), branch antenna (e.g., branch antenna 1524, 1624), and/or enclosure antenna (e.g., enclosure antenna 1414, 1415, 1614, 1615).

In some examples, tuner switch 568 may convert an antenna of the watch body from one type of antenna to a different type of antenna. For example, an enclosure antenna (e.g., enclosure antenna 1414, 1415, 1614, 1615) may be converted from a monopole antenna to a loop antenna by switching tuner switch 568 to ground (e.g., a PCB ground plane) through short circuit 579. Shorting tuner switch 568 to ground may change an effective radiation geometry of the enclosure antenna and convert it from a monopole antenna to a loop antenna. Tuner switch 568 may convert the enclosure antenna from a loop antenna to a monopole antenna by removing the short to ground by opening short circuit 579.

Although FIG. 5 shows tuner switch 568 as including a single pole switch selecting one of 4 tuning elements (e.g., inductor 570, resistor 574, open circuit 576, and capacitor 578), the present disclosure is not so limited. Tuner switch 568 may switch any value of capacitor 578, inductor 570, or resistor 574 in series and/or in parallel with each antenna of the watch body. For example, capacitor 578 may include a fixed value of capacitance or a programmable value of capacitance. Inductor 570 may include a fixed value of inductance or a programmable value of inductance. Resistor 574 may include a fixed value of resistance, a short circuit (e.g., zero ohms), or a programmable value of resistance. LTE RF engine 561 may determine the programmed value of capacitance, inductance, or resistance. The programmed value of capacitance, inductance, or resistance may be selected from a discrete set of values or the values may be variable (e.g., continuously or semi-continuously variable within a programmable range). Further, the selection of capacitance, inductance, or resistance may not be mutually exclusive, and any inclusive combination of capacitance, inductance, or resistance may be switched in series and/or in parallel with each antenna of the watch body.

In some examples, tuner switch 568 may include a feedback loop to further improve wireless performance. Tuner switch 568 may compute an initial setting for capacitive, inductive, or resistive elements to be placed in series and/or in parallel with each antenna of the watch body. After the initial setting of the elements (e.g., the tuning parameters), the efficiency of the antenna may be measured and sent back via a feedback loop to LTE RF engine 561 to determine whether additional tuning is required (e.g., an adjustment of the settings for capacitive, inductive, or resistive elements).

In some examples, tuner switch 568 may switch inductive elements, capacitive elements, resistive elements, or any combination thereof in series and/or parallel to each antenna of the watch body in order to adjust a center frequency of the patch antenna based on the state of a proximity sensor (e.g., sensor 114, proximity sensor 506). A sensor substrate (e.g., sensor substrate 816, 916) may include the proximity sensor (e.g., sensor 114, proximity sensor 506) configured to determine the proximity of the watch body to a user. The user's body (e.g., the user's lower arm) may change the impedance matching, the radiated power, and/or the radiation pattern of the antennas of the watch body, which may degrade the performance of the wireless communications in the watch body. For example, an antenna in a mobile device (e.g., a smartwatch) may suffer a 6 dB impedance mismatching loss when the user's finger touches certain portions of the smartwatch (e.g., as shown in FIG. 3), which may result in a significant reduction in antenna performance. Tuner switch 568 may mitigate the effects of the human body on antenna performance by adjusting the center frequency of the antenna based on proximity to the user.

Figure 6A:
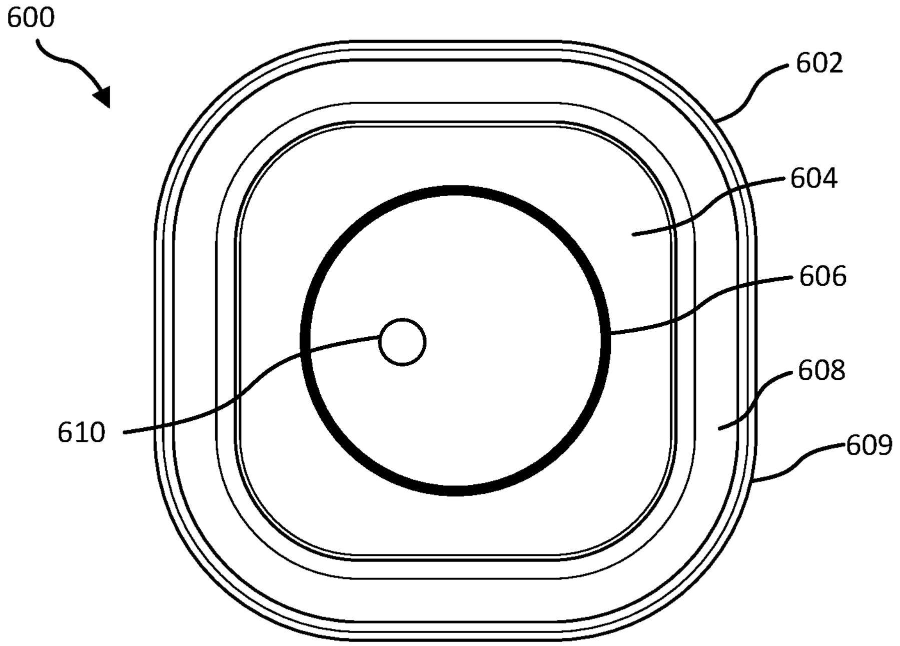
FIG. 6A is a bottom plan view of an example watch assembly, according to at least one embodiment of the present disclosure.
Figure 6B:
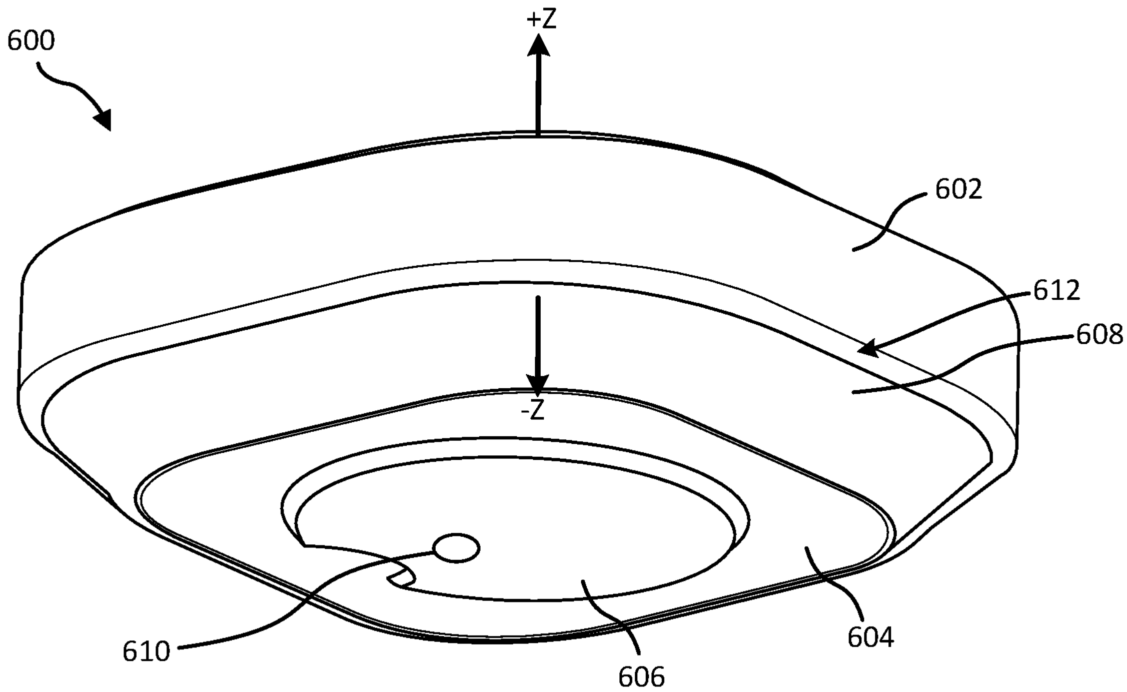
FIG. 6B is a perspective view of the example watch assembly of FIG. 6A, according to at least one embodiment of the present disclosure.

FIG. 6A is a bottom plan view and FIG. 6B is a perspective view of an example watch assembly 600 including a watch body 609 and a cradle 608, according to at least one embodiment of the present disclosure. Watch body 609 may include an enclosure 602 (e.g., an electrically conductive enclosure) that extends around a perimeter of watch body 609. Watch assembly 600 may include a cradle 608 (e.g., an electrically non-conductive or conductive cradle) that is configured as a coupling mechanism for detachably coupling watch body 609 to a watch band (e.g., watch band 112 of FIG. 1). Watch assembly 600 may include a non-conductive base 604 (e.g., an underside of a lower housing of watch body 609) including a structure between cradle 608 and a sensor dome 606. Sensor dome 606 may include a proximity sensor 610 (e.g., a heart rate sensor) that determines a proximity of watch assembly 600 to a user's skin.

As will be further explained below with reference to FIG. 7, in some examples, watch body 609 may include a ground plane (e.g., a conductive layer such as ground plane 708 of FIG. 7) within an interior portion of watch body 609 and a slot antenna that includes a radiating slot defined by a gap between the ground plane and enclosure 602. The slot antenna may radiate radio waves substantially along a +Z axis and −Z axis. In some examples, watch assembly 600 may include a cradle gap 612 between enclosure 602 and cradle 608. Cradle gap 612 may include a non-conductive material. Additionally or alternatively, the slot antenna may radiate radio waves through cradle gap 612 that may be present between enclosure 602 and cradle 608. Cradle gap 612 may include a gap greater than or equal to about 0.5 mm, such as about 0.75 mm, about 1 mm, about 1.25 mm, or about 1.5 mm. As described in detail with reference to FIGS. 9-13 below, a ground plane of watch body 609 may be electrically connected to cradle 608. Cradle 608 may be configured as a conductive cradle and a ground plane of watch body 609 may be connected to conductive cradle 608 when watch body 609 is coupled to cradle 608, thereby effectively increasing the size of the ground plane and increasing a gain of antenna(s) within watch body 609.

In some examples, watch body 609 may include a patch antenna within an interior portion (e.g., the lower housing) of watch body 609 that substantially surrounds a sensor substrate disposed proximate to sensor dome 606. Without limitation, the patch antenna may radiate radio waves through non-conductive base 604 (e.g., the underside of the lower housing of watch body 609). In some examples, watch body 609 may include an antenna tuning circuit that tunes the slot antenna and/or the patch antenna depending on whether watch body 609 is worn by the user.

Figure 7:
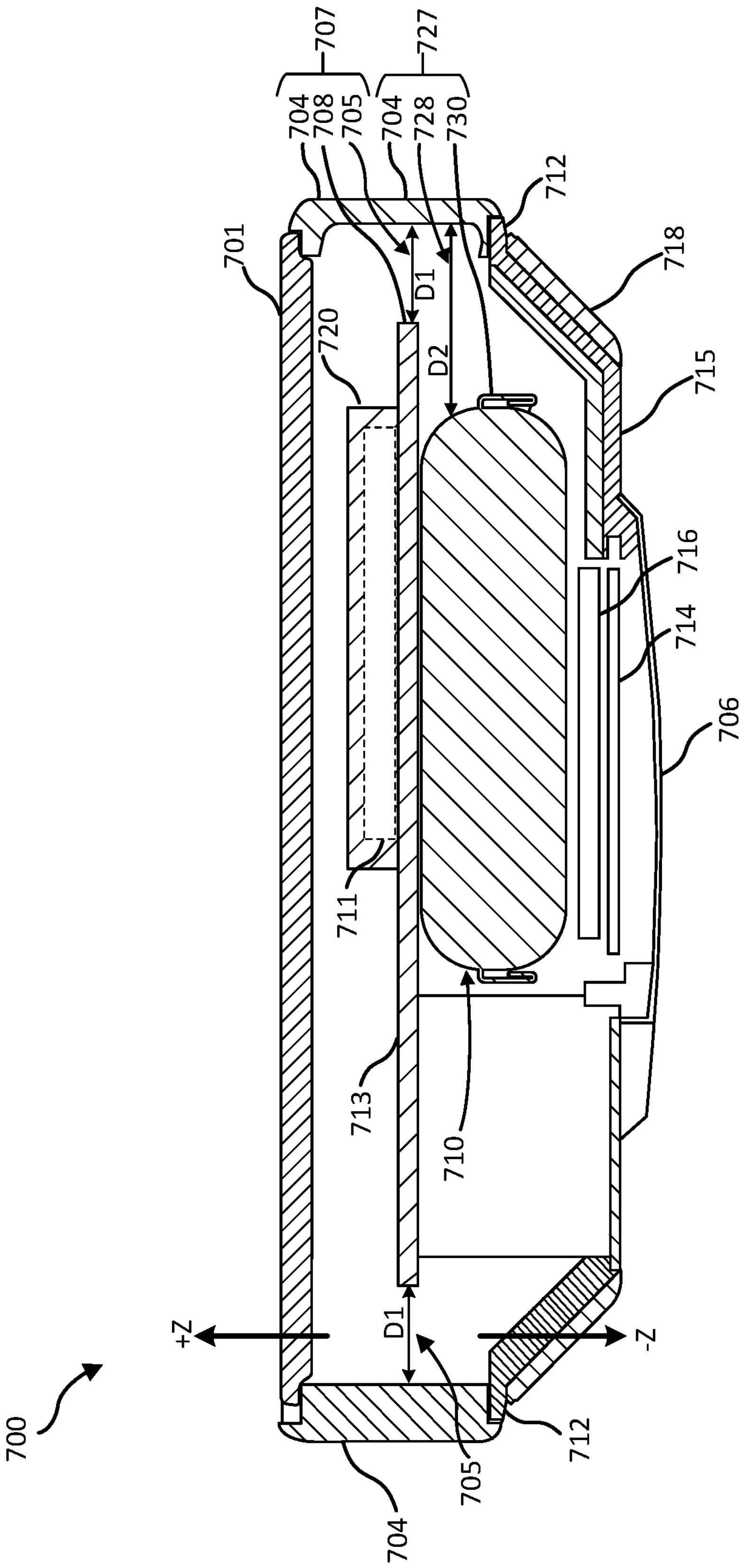
FIG. 7 is a cross-sectional side view of components of an example watch assembly, according to at least one embodiment of the present disclosure.

FIG. 7 is a cross-sectional side view of components of an example watch body 700, according to at least one embodiment of the present disclosure. Watch body 700 may include a slot antenna 707 that includes a radiating slot 705, an enclosure 704, and a ground plane 708 of a printed circuit board 713. Radiating slot 705 may have a width D1 defined by a gap between a conductive portion of enclosure 704 and ground plane 708. In some examples, gap width D1 may include a free space air gap, a non-conductive solid material, or a combination thereof. Gap width D1 may be based on the wavelength of the RF energy to be radiated by slot antenna 707. For example, gap width D1 may be greater than or equal to about 0.5 mm, such as about 0.75 mm, about 1 mm, about 1.25 mm, or about 1.5 mm. Radiating slot 705 may extend along a perimeter (e.g., an inner perimeter) of enclosure 704. As shown in FIG. 7, slot antenna 707 may radiate (e.g., transmit and/or receive) radio waves in radiating slot 705 substantially along the Z axis in the +Z direction through display glass 701 and/or in the −Z direction through a non-conductive base 715.

In some examples, watch body 700 may include multiple slot antennas. For example, watch body 700 may include slot antenna 707 and further include at least one additional slot antenna 727 that includes a radiating slot 728, enclosure 704, and a conductive battery casing 730. Conductive battery casing 730 may be electrically connected to ground plane 708. Radiating slot 728 may have a width D2 defined by a gap between a conductive portion of enclosure 704 and conductive battery casing 730. In some examples, gap width D2 may include a free space air gap, a non-conductive solid material, or a combination thereof. Gap width D2 may be based on the wavelength of the RF energy to be radiated by slot antenna 727. For example, gap width D2 may be greater than or equal to about 0.5 mm, such as about 0.75 mm, about 1 mm, about 1.25 mm, about 1.5 mm, about 2.0 mm, or more. Slot antenna 727 may extend along a perimeter (e.g., an inner perimeter) of enclosure 704. As shown in FIG. 7, slot antenna 727 may radiate (e.g., transmit and/or receive) radio waves in radiating slot 728 substantially along the Z axis in the +Z direction through display glass 701 and/or in the −Z direction through a non-conductive base 715.

In some examples, slot antenna 707 may radiate (e.g., transmit and/or receive) radio waves in an omnidirectional pattern, an isotropic pattern, a lobe pattern, or a combination thereof. Additionally or alternatively, slot antenna 707 may radiate radio waves through a non-conductive cradle gap 712. Cradle gap 712 may include a non-conductive material positioned between enclosure 704 and cradle 718. In some examples, cradle gap 712 may include a gap greater than or equal to about 0.2 mm, such as about 0.3 mm, about 0.4 mm, about 0.5 mm, about 0.6 mm, about 0.8 mm, or about 1.0 mm.

Enclosure 704 may include any conductive material including, without limitation, one or more metals (e.g., copper, steel, aluminum, stainless steel, gold, etc.), alloys, graphite, doped materials, etc. Ground plane 708 may include any planar conductive material. For example, ground plane 708 may include a copper layer within printed circuit board 713. Ground plane 708 may include a low impedance path to an electrical ground (e.g., analog ground and/or digital ground) of watch body 700. As described in detail with reference to FIGS. 9-13 below, ground plane 708 may be electrically connected to cradle 718 when watch body 700 is coupled to cradle 718. Cradle 718 may be configured as a conductive cradle and ground plane 708 may be connected to conductive cradle 718 through spring-loaded pins (e.g., as described below with reference to FIGS. 10 and 11) and/or through capacitive coupling (e.g., as described below with reference to FIGS. 12 and 13) when enclosure 704 is coupled to cradle 718, thereby effectively increasing the size of ground plane 708 and increasing a gain of slot antenna 707 and/or slot antenna 727.

Battery 710 may provide power for the electrical components in watch body 700. In some examples, battery 710 may include an outer conductive layer (e.g., a metallic foil covering) that may provide a low impedance path to ground plane 708. Sensor substrate 716 may be electrically connected to the outer conductive layer of battery 710. The outer conductive layer of battery 710 may act as a low impedance ground path that creates substantially the same ground reference potential for ground plane 708 and sensor substrate 716. Watch body 700 may include one or more ground points. Current flowing through the finite resistance of the ground point(s) may create a ground loop that causes interference and noise in the components of watch body 700. The outer conductive layer of battery 710 may act as a low-impedance ground path that reduces interference and noise that may be caused by ground loops.

In some examples, a shield 720 may include a conductive material substantially covering an RF circuit 711 and electrically connected to ground plane 708. Shield 720 may electrically isolate RF circuit 711 and reduce electrical interference generated by RF circuit 711 from affecting surrounding circuits and/or reduce electrical interference generated by surrounding circuits from affecting RF circuit 711. RF signals between RF circuit 711 and slot antenna 707 and/or patch antenna 714 may travel through antenna feeds.

In some examples, watch body 700 may include a patch antenna 714. Patch antenna 714 may include a substantially planar conductor (e.g., a metal layer). Patch antenna 714 may be disposed substantially parallel to ground plane 708 and adjacent to sensor dome 706. Patch antenna 714 may radiate radio waves through at least sensor dome 706.

A sensor substrate 716 may also be disposed within watch body 700. Sensor substrate 716 may include a printed circuit board populated with sensing and/or conditioning circuits and sensors. For example, sensor substrate 716 may include the sensors described above with reference to FIG. 1. Sensor substrate 716 may be positioned adjacent to sensor dome 706. Sensor dome 706 may be positioned to contact a user's skin when worn by the user such that proximity sensors (e.g., sensor 114 of FIG. 1) on sensor substrate 716 may sense whether the user is wearing watch body 700. RF circuit 711 may read the status of the proximity sensor to determine whether the user is wearing watch body 700 and tune patch antenna 714 and/or slot antenna 707 to improve wireless communications performance (e.g., antenna performance) of watch body 700 based on whether the user is wearing watch body 700. For example, RF circuit 711 may adjust a center frequency of patch antenna 714 and/or slot antenna 707 based on the state of the proximity sensor.

Figure 8:
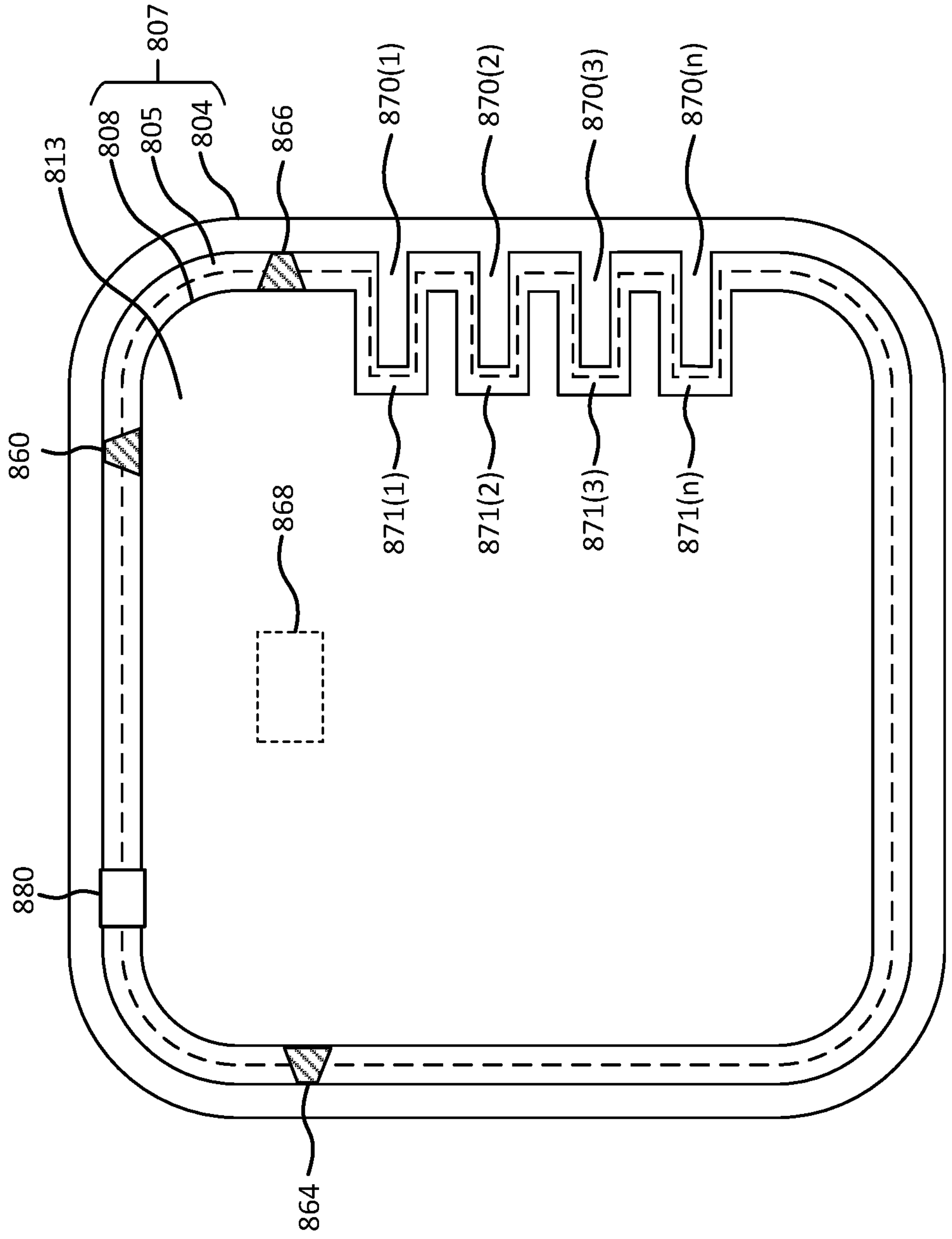
FIG. 8 is a plan view of a multiband slot antenna, according to at least one embodiment of the present disclosure.

FIG. 8 is a plan view of a multiband slot antenna 807, according to at least one embodiment of the present disclosure. Multiband slot antenna 807 may include a gap 805 between a ground plane 808 and a conductive enclosure 804. RF circuit 868 may be disposed on a printed circuit board 813 within conductive enclosure 804 (e.g., a watch body) and may transmit and/or receive RF signals to/from slot antenna 807. RF circuit 868 may transmit and/or receive RF signals conformant to the LTE standard through LTE feed 864 (e.g., a press-fit connector, a screw, etc.). RF circuit 868 may transmit and/or receive RF signals conformant to the GPS/WiFi/BT standards through GPS/WiFi/BT feed 860. In some examples, slot antenna 807 may be connected to a tuner switch (e.g., tuner switch 1468 of RF circuit) through tuner feed 866.

As described in detail above with reference to FIG. 5, the tuner switch may switch one or more inductive elements, capacitive elements, resistive elements, or any combination thereof in series and/or parallel with slot antenna 807 in order to adjust a center frequency of slot antenna 807 based on the state of a proximity sensor (e.g., sensor 114 of FIG. 1). The tuner switch may improve the LTE wireless performance (e.g., wireless coverage and/or bandwidth) in the frequency range of about 600 MHz to 2700 MHz. Shorting pin 880 may connect conductive enclosure 804 to ground plane 808. In some examples, the position of shorting pin 880 with respect to LTE feed 864 and/or GPS/WiFi/BT feed 860 may influence the impedance of slot antenna 807.

In some examples, conductive enclosure 804 may include at least one inward protrusion 870(1) . . . **870(*n*). Inward protrusions 870(1) . . . 870(*n*) may be configured as conductive elements (e.g., metal tabs) that extend from an inside perimeter of conductive enclosure 804 towards channels 871(1) . . . 871(*n*) (e.g., slots) within ground plane 808. As shown in FIG. 8, inward protrusions 870(1) . . . 870(*n*) may be disposed between channels 871(1) . . . 871(*n*) to create an interdigitated (e.g., a comb-like) structure. Gap 805 may be configured as a continuous gap between ground plane 808 and conductive enclosure 804 around the perimeter of ground plane 808 and form slot antenna 807 that is configured to radiate electromagnetic signals from RF circuit 868. Gap 805 may include a free space air gap, a non-conductive solid material, or a combination thereof. Gap 805 may include a space between conductive enclosure 804 and ground plane 808** of less than 1.0 mm, about 1.0 mm to about 1.5 mm, about 1.5 mm to about 2.0 mm, or greater than 2.0 mm.

In some examples, gap 805 may meander between channels 871(1) . . . **870(*n*) of ground plane 808 and inward protrusions 870(1) . . . 870(*n*) of conductive enclosure 804 in the comb-like structure to effectively increase the length (e.g., physical length and/or electrical length) of gap 805. In some examples, the length of gap 805 may be about half of a wavelength of a radio frequency transmitted and/or received by slot antenna 807. By increasing the length of gap 805 by meandering gap 805 through the comb-like structure of channels 871(1) . . . 871(*n*) and inward protrusions 870(1) . . . 870(*n*), slot antenna 807 may radiate longer wavelengths (e.g., lower resonant frequencies) than an antenna architecture without a longer gap 805. In some examples, slot antenna 807** may be configured to radiate with at least one frequency in a frequency band of about 600 MHz to about 2700 MHz.

Figure 9:
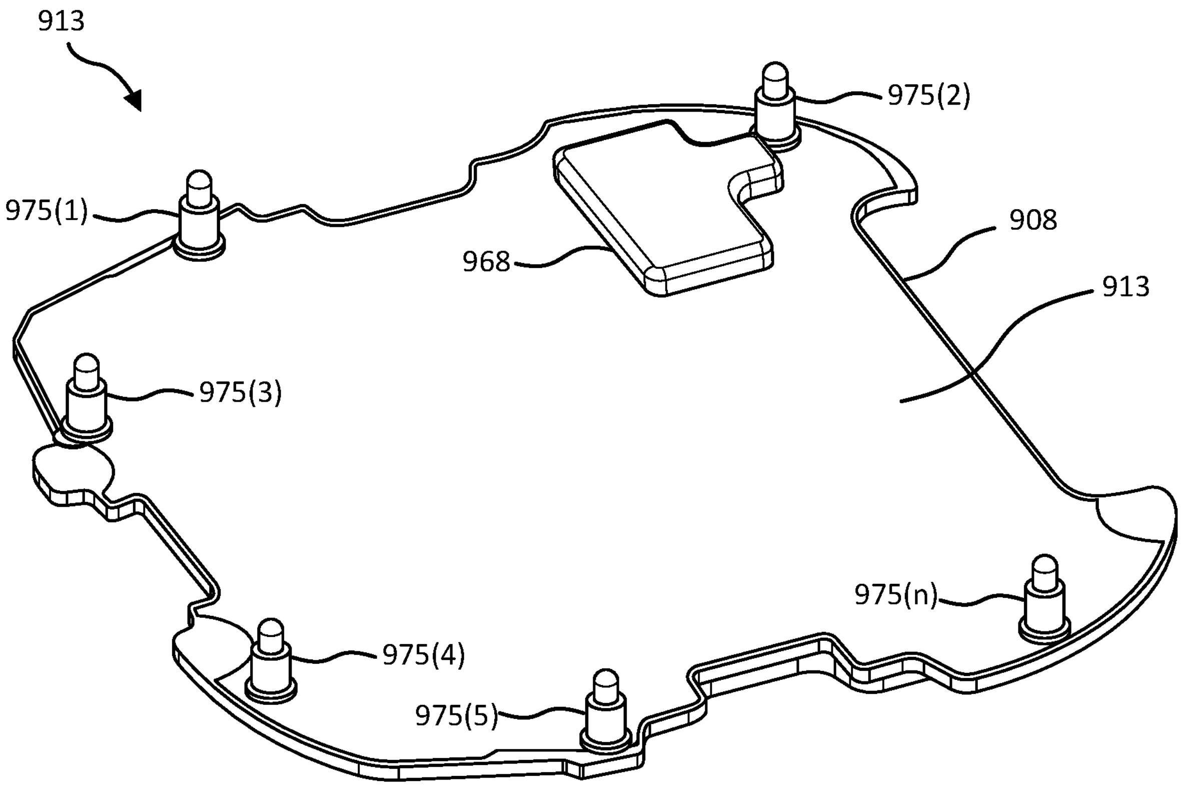
FIG. 9 is a perspective view of electrical conductors extending from a ground plane of a printed circuit board, according to at least one embodiment of the present disclosure.

FIG. 9 is a perspective view of electrical conductors 975(1) . . . **975(*n*) extending from a ground plane 908 of a printed circuit board 913, according to at least one embodiment of the present disclosure. Electrical conductors 975(1) . . . 975(*n*) may extend from ground plane 908 of printed circuit board 913 through a non-conductive portion of an enclosure. Electrical conductors 975(1) . . . 975(*n*) may create one or more electrical connections between ground plane 908 and a conductive watch cradle when the watch body is coupled to the conductive watch cradle. By electrically connecting ground plane 908 to the conductive watch cradle, the size of the ground plane may be effectively increased in area and/or volume. Energy radiated from the slot antenna driven by RF circuit 968 may be reflected off the larger ground plane and reinforce the energy from the slot antenna, thereby increasing the gain of the slot antenna. The increased antenna gain may result in higher link margin, larger wireless coverage area, and/or bandwidth. For example, the gain of the slot antenna (e.g., slot antenna 807 of FIG. 8**) may be increased by at least 1 dB, at least 2 dB, at least 3 dB, at least 4 dB, at least 5 dB, or more.

Electrical conductors 975(1) . . . **975(*n*) may be any type of electrical conductor configured to connect ground plane 908 with the conductive cradle. For example, electrical conductors 975(1) . . . 975(*n*) may include spring-loaded pins, pogo pins, jacks, plugs, spring connectors, or a combination thereof. Ground plane 908 may have any number of electrical conductors 975(1) . . . 975(*n*) extended from printed circuit board 913. Increasing the number of electrical conductors 975(1) . . . 975(*n*) extending from printed circuit board 913 to the conductive cradle may reduce the impedance between ground plane 908 and the conductive cradle. Although FIG. 9 shows electrical conductors 975(1) . . . 975(*n*) extending from printed circuit board 913 to the conductive cradle on a perimeter of printed circuit board 913, the present disclosure is not so limited and electrical conductors 975(1) . . . 975(*n*) may be positioned anywhere on printed circuit board 913**.

Figure 10:
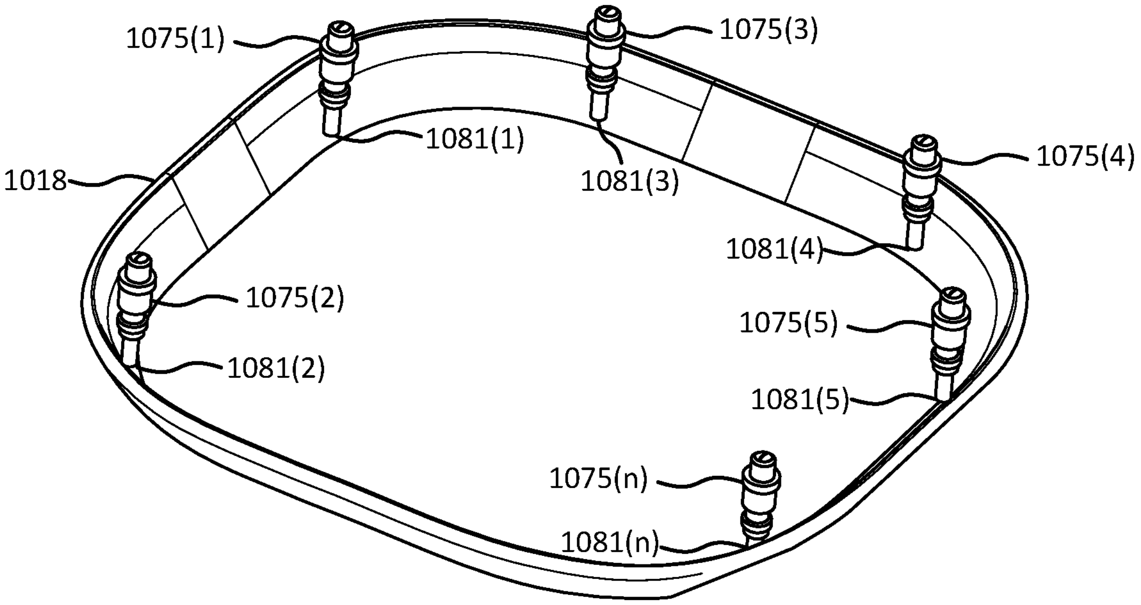
FIG. 10 is a perspective view of electrical conductors contacting an outer conductive ring, according to at least one embodiment of the present disclosure.

FIG. 10 is a perspective view of electrical conductors 1075(1) . . . **1075(*n*) contacting a conductive cradle 1018, according to at least one embodiment of the present disclosure. As described above with reference to FIG. 9, electrical conductors 1075(1) . . . 1075(*n*) may extend from a ground plane (e.g., ground plane 908 of FIG. 9) through a non-conductive portion of an enclosure (e.g., a watch body). Electrical conductors 1075(1) . . . 1075(*n*) may create one or more electrical connections between the ground plane and conductive cradle 1018 (e.g., a conductive watch cradle) when the enclosure is coupled to the conductive cradle 1018. By electrically connecting the ground plane to conductive cradle 1018, the size of the ground plane may be effectively increased by the area and volume of conductive cradle 1018**.

Energy radiated from the slot antenna may be reflected off the effectively larger ground plane and reinforce the energy from the slot antenna to increase the gain of the slot antenna. In order to show a clearer description of the position of electrical conductors 1075(1) . . . **1075(*n*) contacting conductive cradle 1018, FIG. 10 does not show the connection of electrical conductors 1075(1) . . . 1075(*n*) to the ground plane or electrical conductors 1075(1) . . . 1075(*n*) extending through a lower portion of the enclosure (e.g., the watch body). Electrical conductors 1075(1) . . . 1075(*n*) may contact conductive cradle 1018 at connection points 1081(1) . . . 1081(*n*), respectively. In some examples, electrical conductors 1075(1) . . . 1075(*n*) may be configured as spring-loaded pins that maintain contact with conductive cradle 1018 at connection points 1081(1) . . . 1081(*n*) by a force exerted by the spring-loaded pins against an inside perimeter wall of conductive cradle 1018**.

Figure 11:
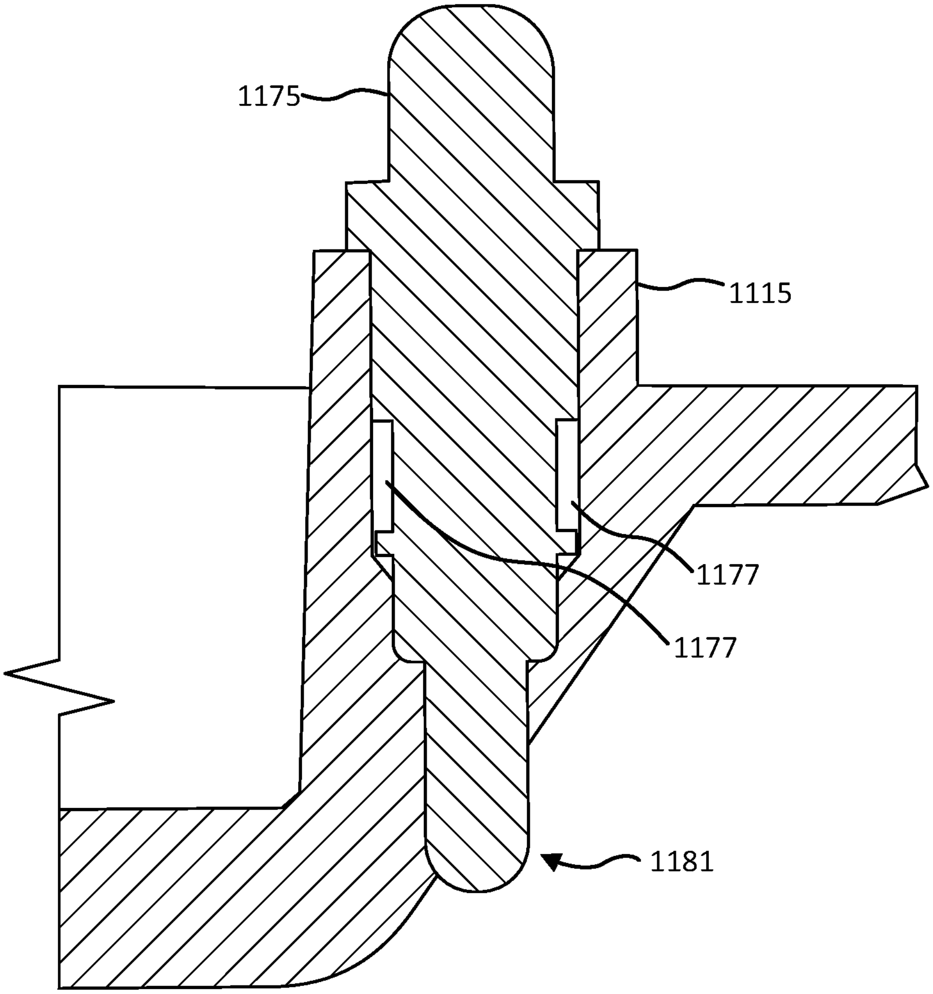
FIG. 11 is a cross-sectional view of an electrical conductor extending through a non-conductive portion of an enclosure, according to at least one embodiment of the present disclosure.

FIG. 11 is a cross-sectional view of an electrical conductor 1175 extending through a non-conductive portion of an enclosure 1115, according to at least one embodiment of the present disclosure. As described above with reference to FIGS. 9 and 10, electrical conductor 1175 may extend from a ground plane (e.g., ground plane 908 of FIG. 9) through a non-conductive portion of enclosure 1115. Electrical conductor 1175 may extend from a ground plane through a non-conductive portion of enclosure 1115 to contact a conductive cradle (e.g., conductive cradle 1018 of FIG. 10). Electrical conductor 1175 may include a contact point 1181 that is positioned to contact the conductive cradle when the enclosure (e.g., watch body) is coupled to the conductive cradle. Electrical conductor 1175 may be secured within enclosure 1115 by securing elements 1177. Securing elements 1177 may be any type of mechanism that secures electrical conductor 1175 to enclosure 1115. For example, securing elements 1177 may include an interference fit, a press fit, a friction fit, a tongue and groove fit, an adhesive, a spring, etc. Electrical conductor 1175 may be configured as a spring-loaded pin that maintains contact with the conductive cradle when the enclosure is coupled to the conductive cradle.

Figure 12:
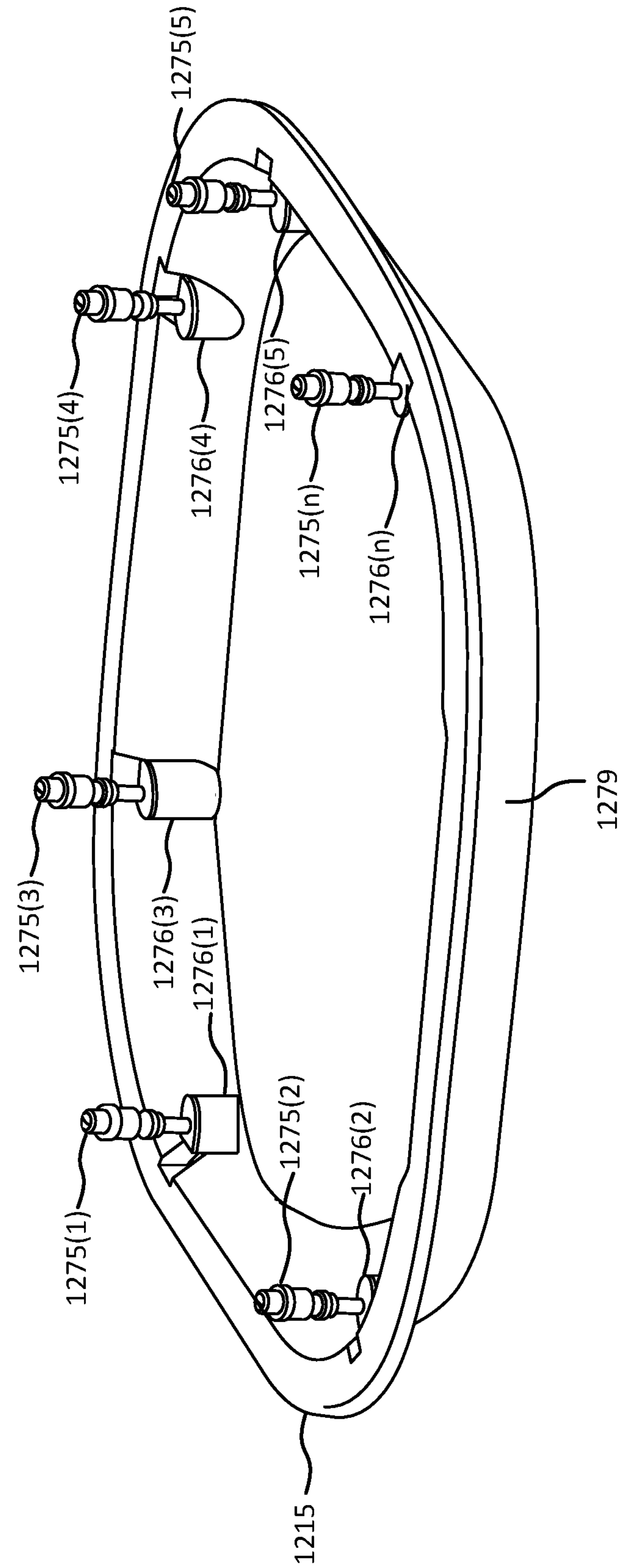
FIG. 12 is a perspective view of an outer conductive ring disposed on a non-conductive portion of an enclosure, according to at least one embodiment of the present disclosure.

FIG. 12 is a perspective view of an outer conductive ring 1279 disposed on a non-conductive portion of an enclosure base 1215 (e.g., a lower portion of a watch body), according to at least one embodiment of the present disclosure. In some examples, outer conductive ring 1279 may include a layer of conductive material (e.g., copper, aluminum, gold, metal, metal alloy, etc.) disposed on an outer perimeter of enclosure base 1215 (e.g., non-conductive enclosure base 715 of FIG. 7). As will be described in detail with reference to FIG. 13, outer conductive ring 1279 may be coupled to electrical conductors 1275(1) . . . **1275(*n*) through conductive feedthroughs 1276(1) . . . 1276(*n*) respectively. Electrical conductors 1275(1) . . . 1275(*n*) may be configured as spring-loaded pins that maintain contact with a top portion of conductive feedthroughs 1276(1) . . . 1276(*n*), as shown in FIG. 12. Electrical conductors 1275(1) . . . 1275(*n*) may be configured as shown in FIG. 9 such that electrical conductors 1275(1) . . . 1275(*n*) are electrically connected to a ground plane of a printed circuit board (e.g., ground plane 908 of printed circuit board 913 of FIG. 9) to electrically connect outer conductive ring 1279** to the ground plane.

Outer conductive ring 1279 may be applied to the non-conductive portion of an enclosure base 1215 (e.g., a lower portion of a watch body) by any suitable method. For example, outer conductive ring 1279 may be applied to the non-conductive portion of an enclosure base 1215 by electroplating, chemical vapor deposition, sputtering, etc. In some examples, outer conductive ring 1279 may be applied to the non-conductive portion of an enclosure base 1215 by a Laser Direct Structuring (LDS) process. The LDS process may use a thermoplastic material doped with a non-conductive metallic inorganic compound activated by a laser to define the area of outer conductive ring 1279. A subsequent metallization process (e.g., a copper bath) may apply the conductive material to the area of outer conductive ring 1279. In some examples, outer conductive ring 1279 may include a non-conductive cosmetic or protective surface coating (e.g., paint, etc.) applied on top of outer conductive ring 1279.

In some examples, outer conductive ring 1279 may be disposed adjacent to an inner perimeter of a conductive cradle when the enclosure (e.g., a watch body) is coupled to the conductive cradle. Outer conductive ring 1279 may be configured to be directly or capacitively coupled to the conductive cradle when disposed adjacent to the conductive cradle. In some examples, capacitively coupling outer conductive ring 1279 to the conductive cradle may electrically connect the conductive cradle to the ground plane. By electrically connecting the ground plane (e.g., ground plane 908 of FIG. 9) to the conductive watch cradle, the size of the ground plane may be effectively increased in area and/or volume. Energy radiated from the slot antenna may be reflected off the larger ground plane and reinforce the energy from the slot antenna to increase the gain of the slot antenna. The increase in antenna gain may result in higher link margin, larger wireless coverage area, and/or bandwidth. For example, the gain of the slot antenna (e.g., slot antenna 807 of FIG. 8) may be increased by at least 1 dB, at least 2 dB, at least 3 dB, at least 4 dB, at least 5 dB, or more.

Figure 13:
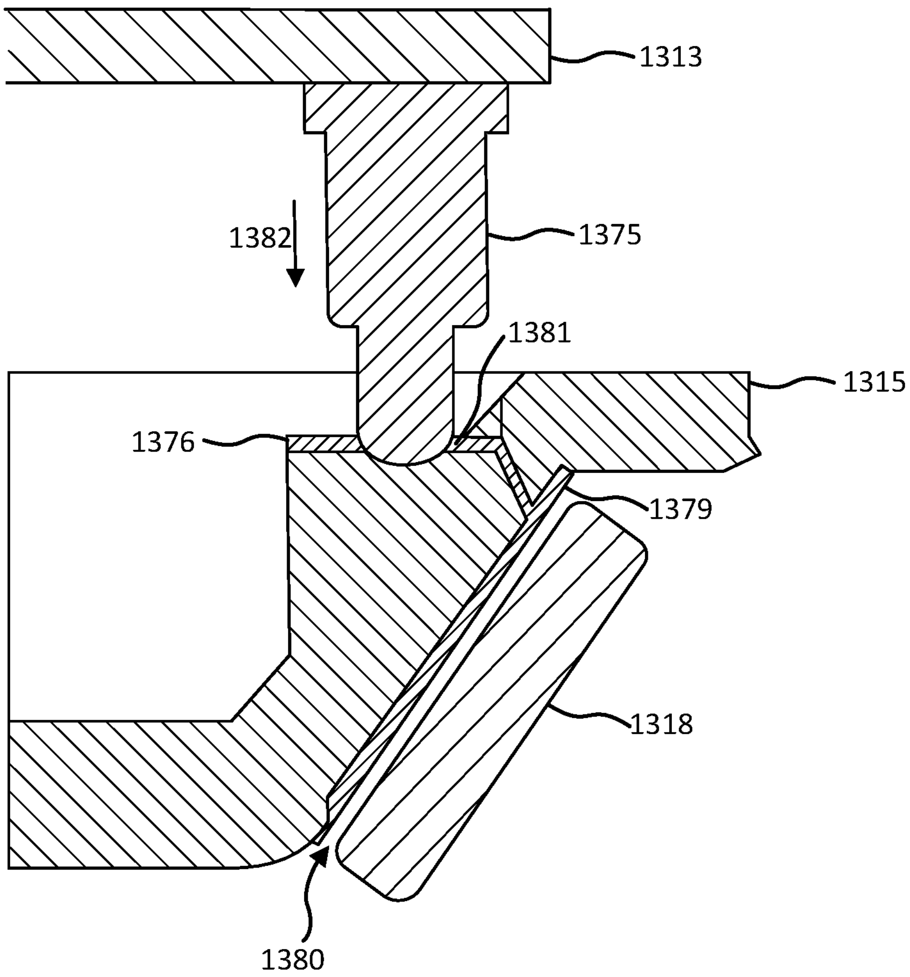
FIG. 13 is a cross-sectional view of an electrical conductor extending through a non-conductive portion of an enclosure to an outer conductive ring, according to at least one embodiment of the present disclosure.

FIG. 13 is a cross-sectional view of an electrical conductor 1375 extending through a non-conductive portion of an enclosure to an outer conductive ring 1379, according to at least one embodiment of the present disclosure. As described above with reference to FIG. 12, electrical conductor 1375 (e.g., a spring-loaded pin, a solid pin, a wire, a conductive via, solder, etc.) may be connected to a ground plane of a printed circuit board 1313 and extend through a non-conductive portion of an enclosure (e.g., enclosure 1115 of FIG. 11) to outer conductive ring 1379. Electrical conductor 1375 may be connected to outer conductive ring 1379 through a conductive feedthrough 1376. In some examples, electrical conductor 1375 may be a spring-loaded pin that maintains contact to conductive feedthrough 1376 at contact point 1381 by a spring force generated in a direction indicated by arrow 1382. Outer conductive ring 1379 may be applied to the non-conductive portion of an enclosure base 1315 by electroplating, chemical vapor deposition, sputtering, etc. In some examples, outer conductive ring 1379 may be applied to the non-conductive portion of an enclosure base 1315 by an LDS process. In some examples, conductive feedthrough 1376 may be constructed by the same process or a different process than outer conductive ring 1379. Conductive feedthrough 1376 may also be constructed by an LDS process.

In some examples, outer conductive ring 1379 may be disposed adjacent to an inner perimeter of a conductive cradle 1318 when enclosure 1315 (e.g., a watch body) is coupled to conductive cradle 1318. Outer conductive ring 1379 may be configured to be capacitively coupled to conductive cradle 1318 when disposed adjacent to conductive cradle 1318 as shown in FIG. 13. Capacitively coupling outer conductive ring 1379 to conductive cradle 1318 may electrically connect conductive cradle 1318 to the ground plane through conductive feedthrough 1376 and electrical conductor 1375. By electrically connecting the ground plane (e.g., ground plane 908 of FIG. 9) to conductive cradle 1318, the size of the ground plane may be effectively increased in area and/or volume.

Energy radiated from the slot antenna may be reflected off the larger ground plane and reinforce the energy from the slot antenna thereby increasing the gain of the slot antenna. The capacitive coupling between outer conductive ring 1379 and conductive cradle 1318 may be based on the area of adjacency between outer conductive ring 1379 and conductive cradle 1318, the size of a gap 1380 between outer conductive ring 1379 and conductive cradle 1318, and the dielectric constant of the material between outer conductive ring 1379 and conductive cradle 1318. For example, the area of adjacency between outer conductive ring 1379 and conductive cradle 1318 may extend around a portion of or the entire perimeter of outer conductive ring 1379 and conductive cradle 1318. In some examples, the size of gap 1380 between outer conductive ring 1379 and conductive cradle 1318 may be within the range of about 200 microns to about 500 microns. The dielectric constant of the material (e.g., air, a polymer, etc.) between outer conductive ring 1379 and conductive cradle 1318 may be about 1.

As described in detail above, an antenna architecture of a mobile electronic device (e.g., a wearable device, a smartwatch, a wristband system, etc.) may include multiple antennas and devices that enable wireless communication for the mobile electronic device. The multiple antennas and devices may include a slot antenna, an extended ground plane, a patch antenna, a trace antenna, a branch antenna, an enclosure antenna, or any combination thereof. The antenna architecture within the wearable device may include a ground plane having channels (e.g., slots) and a conductive enclosure having inward protrusions (e.g., metal tabs). The tabs may be disposed between the slots to create an interdigitated (e.g., comb-like) structure. A continuous gap defined between the ground plane and the conductive enclosure around the perimeter of the ground plane may form a slot antenna that is configured to radiate electromagnetic signals. The gap may meander between the enclosure tabs and the ground plane slots in the comb-like structure to effectively increase the length (e.g., physical length and/or electrical length) of the gap. Advantages of embodiments of the present disclosure may include increasing the length of the gap in the slot antenna to create a lower resonant frequency of the slot antenna as compared to a slot antenna without the increased gap length due to the comb-like structure of the enclosure tabs and ground plane slots.

In some embodiments, the wearable device may include an expanded ground plane to further improve wireless communication performance. In some examples, the size of the ground plane may be effectively increased by electrically connecting the ground plane in the wearable device (e.g., a ground plane in a layer of a printed circuit board) to a conductive portion of the wearable device. For example, the wearable device may include a conductive cradle in a watch band that is detachably coupled to the wearable device enclosure. Electromagnetic energy reflected off the ground plane may reinforce the energy from the radiating antenna (e.g., slot antenna). By effectively increasing the size of the ground plane, more energy radiated from the slot antenna may be reflected off the larger ground plane to increase the gain of the slot antenna. The enclosure (e.g., watch body) may be detachably coupled to the conductive cradle. When the watch body is attached to the conductive cradle, electrical contacts may extend through a lower portion of the watch body creating an electrical connection between the ground plane of the printed circuit board and the conductive watch cradle thereby effectively increasing the size of the ground plane.

In particular embodiments, one or more objects (e.g., data associated with sensors, and/or activity information) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, a biometric data acquisition application, an artificial-reality application, wristband system 100 of FIG. 1, wristband system 200 of FIG. 2, eyewear device 1402 of FIG. 14, virtual-reality system 1500 of FIG. 15, head-mounted display 1702 of FIG. 17, augmented-reality glasses 1820 of FIG. 18, or any other suitable computing system or application. Although the examples discussed herein are in the context of a wristband system and/or artificial-reality system, these privacy settings may be applied to any other suitable computing system.

Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within a wristband application and/or artificial-reality application. When privacy settings for an object allow a particular user or other entity to access that object, the object may be described as being "visible" with respect to that user or other entity. As an example and not by way of limitation, a user of the wristband application and/or artificial-reality application may specify privacy settings for a user-profile page that identify a set of users that may access the wristband application and/or artificial-reality application information on the user-profile page, thus excluding other users from accessing that information. As another example and not by way of limitation, wristband system 100 of FIG. 1, wristband system 200 of FIG. 2, eyewear device 1402 of FIG. 14, virtual-reality system 1500 of FIG. 15, head-mounted display 1702 of FIG. 17, augmented-reality glasses 1820 of FIG. 18 may store privacy policies/guidelines. The privacy policies/guidelines may specify what information of users may be accessible by which entities and/or by which processes (e.g., internal research, advertising algorithms, machine-learning algorithms, etc.), thus ensuring only certain information of the user may be accessed by certain entities or processes.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. Although this disclosure describes using particular privacy settings in a particular manner, this disclosure contemplates using any suitable privacy settings in any suitable manner.

Figure 14:
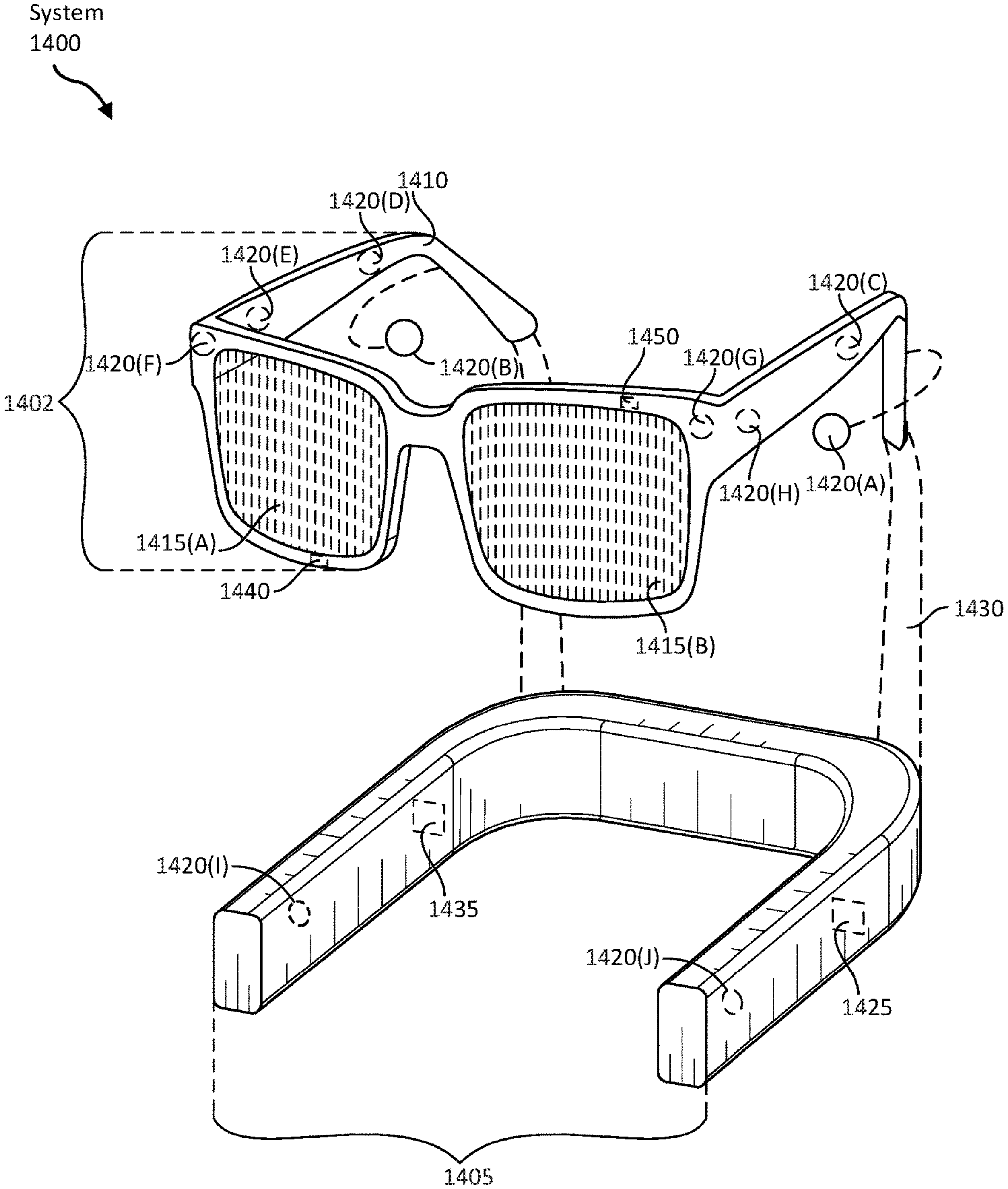
FIG. 14 is an illustration of exemplary augmented-reality glasses that may be used in connection with embodiments of this disclosure.
Figure 15:
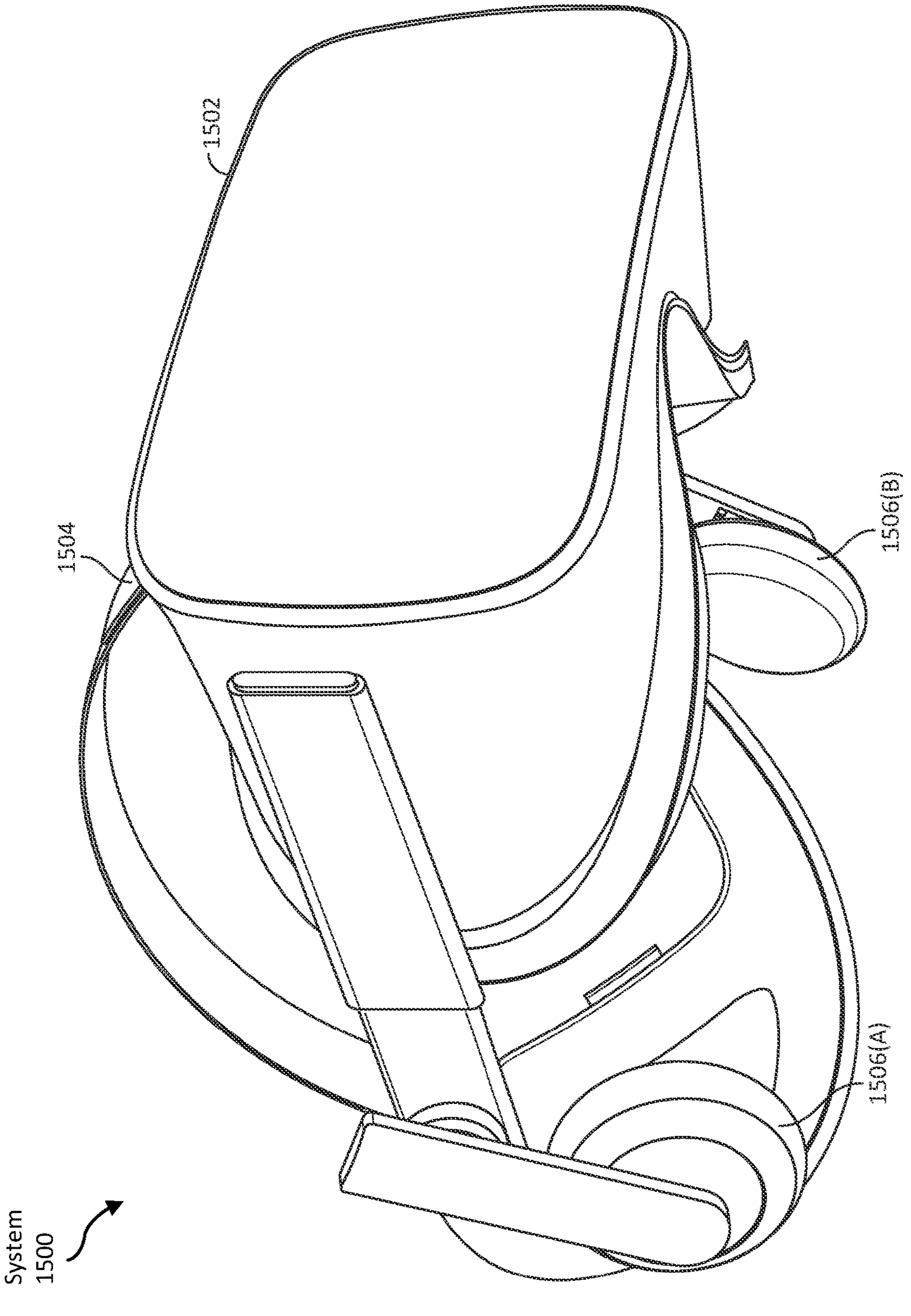
FIG. 15 is an illustration of an exemplary virtual-reality headset that may be used in connection with embodiments of this disclosure.
Figure 17:
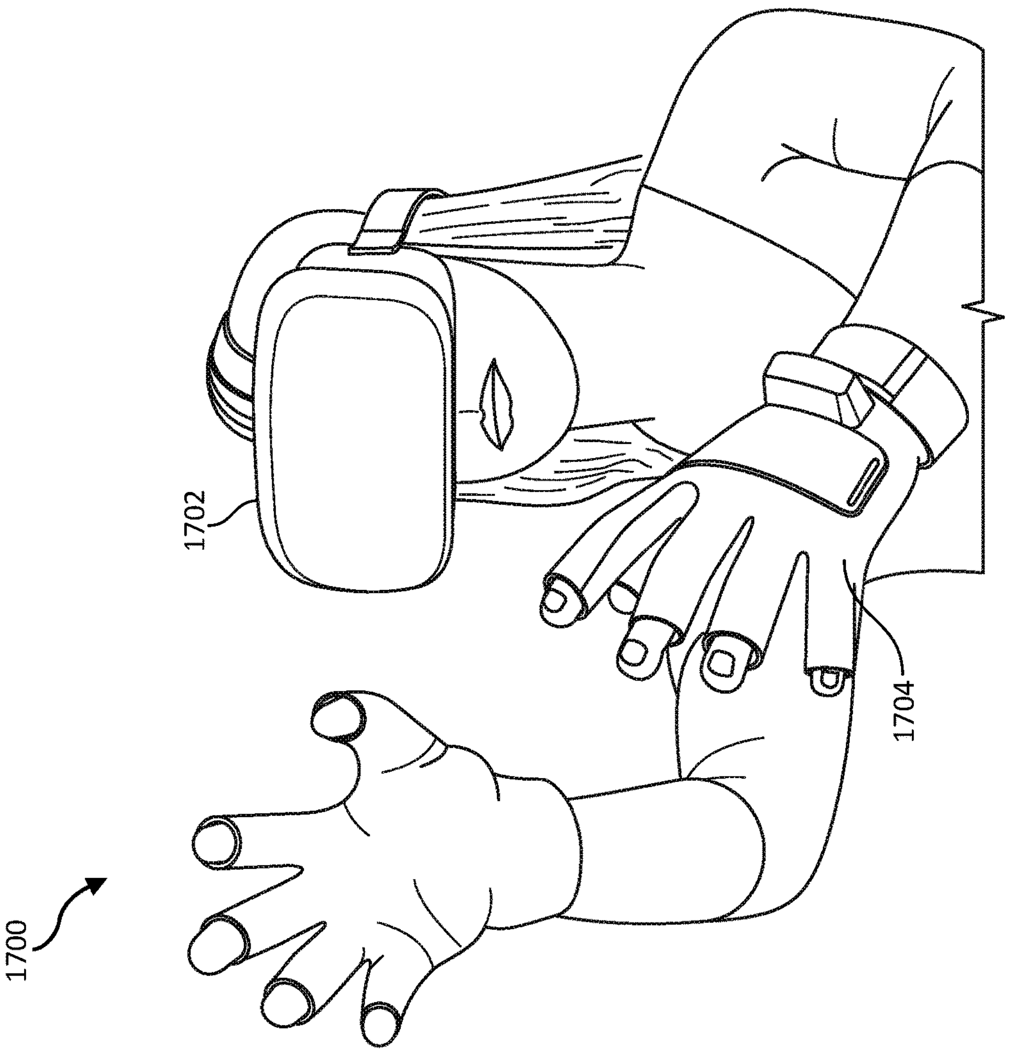
FIG. 17 is an illustration of an exemplary virtual-reality environment according to embodiments of this disclosure.
Figure 18:
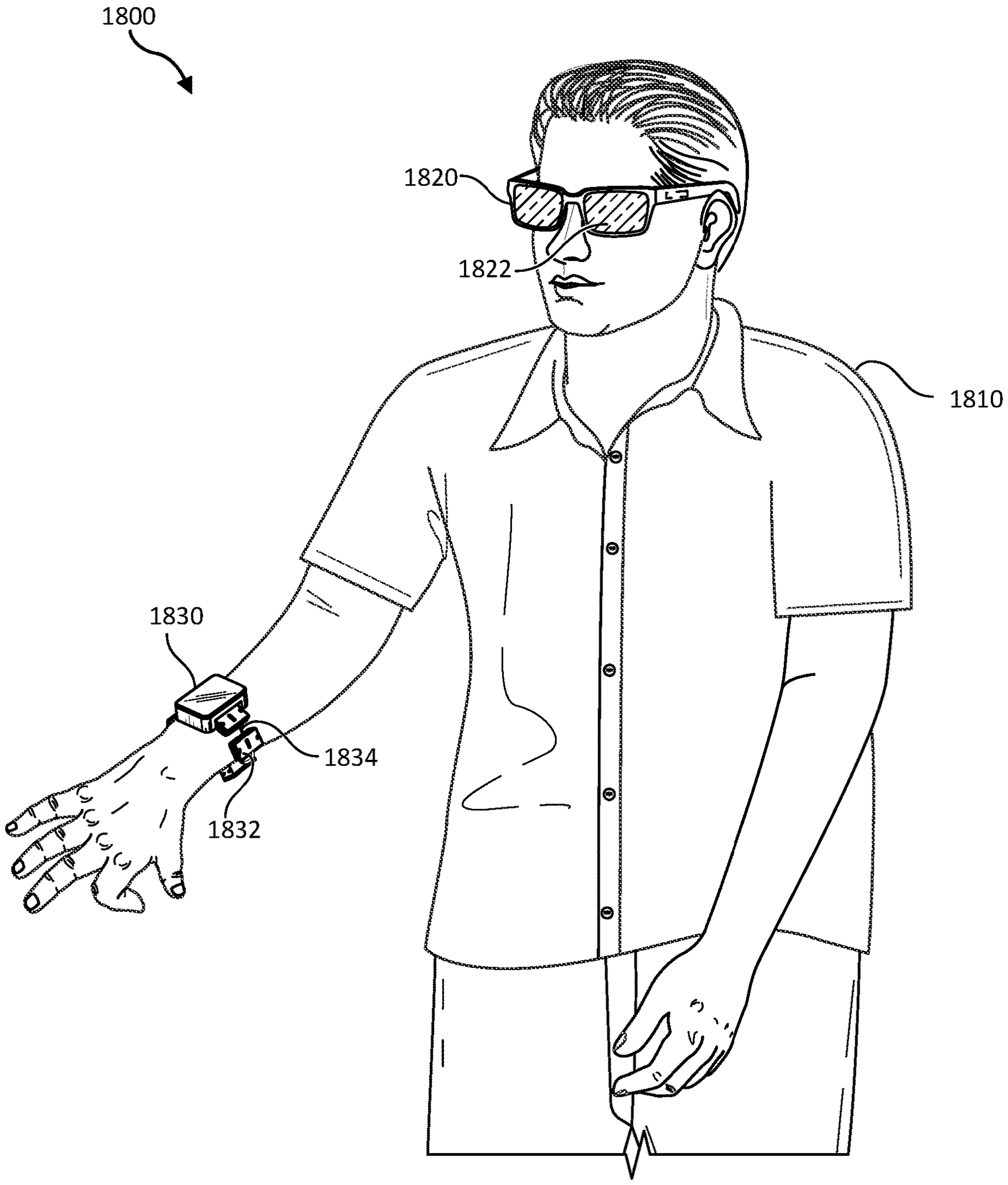
FIG. 18 is an illustration of an exemplary augmented-reality environment according to embodiments of this disclosure.

In particular embodiments, wristband system 100 of FIG. 1, wristband system 200 of FIG. 2, eyewear device 1402 of FIG. 14, virtual-reality system 1500 of FIG. 15, head-mounted display 1702 of FIG. 17, augmented-reality glasses 1820 of FIG. 18 may present a so-called "privacy wizard" (e.g., within a webpage, a module, one or more dialog boxes, a display screen of the wristband system, the display screen of the artificial-reality application, or any other suitable interface) to a first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof.

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, different objects of the same type associated with a user may have different privacy settings. In particular embodiments, one or more default privacy settings may be set for each object of a particular object-type.

In particular embodiments, wristband system 100 of FIG. 1, wristband system 200 of FIG. 2, eyewear device 1402 of FIG. 14, virtual-reality system 1500 of FIG. 15, head-mounted display 1702 of FIG. 17, augmented-reality glasses 1820 of FIG. 18 may have functionalities that may use, as inputs, biometric information of a user for user-authentication or experience-personalization purposes. A user may opt to make use of these functionalities to enhance their experience on the wristband system and/or artificial-reality system. As an example and not by way of limitation, a user may provide biometric information to the wristband system and/or artificial-reality system. The user's privacy settings may specify that such information may be used only for particular processes, such as authentication, and further specify that such information may not be shared with any third-party system or used for other processes or applications associated with the wristband system and/or artificial-reality system. As another example and not by way of limitation, the wristband system and/or artificial-reality system may provide a functionality for a user to provide biometric information to the wristband system and/or artificial-reality system. The user's privacy setting may specify that such biometric information may not be shared with any third-party system or used by other processes or applications associated with the wristband system and/or artificial-reality system. As another example and not by way of limitation, the wristband system and/or artificial-reality system may provide a functionality for a user to provide a reference image (e.g., a facial profile, a retinal scan) to the wristband system and/or artificial-reality system. The wristband system and/or artificial-reality system may compare the reference image against a later-received image input (e.g., to authenticate the user). The user's privacy setting may specify that such biometric information may be used only for a limited purpose (e.g., authentication), and further specify that such biometric information may not be shared with any third-party system or used by other processes or applications associated with the wristband system and/or artificial-reality system.

As described in detail above, the present disclosure details systems, devices, and methods related to an antenna architecture of a mobile electronic device (e.g., a wearable device). The antenna architecture may include multiple antennas that enable wireless communication for the mobile electronic device. The multiple antennas may include a slot antenna, a patch antenna, a trace antenna, a branch antenna, and/or an enclosure antenna. The antenna architecture may include an impedance tuning circuit that compensates for antenna performance loss when the mobile electronic device is proximate to a user. A proximity sensor may detect the proximity of the mobile electronic device to a user and match the impedance of the antennas to the impedance of a circuit driving the antennas thereby increasing the performance of the antennas and the performance of the wireless communications in the mobile electronic device.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1400 in FIG. 14) or that visually immerses a user in an artificial reality (such as, e.g., virtual-reality system 1500 in FIG. 15). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 14, augmented-reality system 1400 may include an eyewear device 1402 with a frame 1410 configured to hold a left display device 1415(A) and a right display device 1415(B) in front of a user's eyes. Display devices 1415(A) and 1415(B) may act together or independently to present an image or series of images to a user. While augmented-reality system 1400 includes two displays, embodiments of this disclosure may be implemented in augmented-reality systems with a single NED or more than two NEDs.

In some embodiments, augmented-reality system 1400 may include one or more sensors, such as sensor 1440. Sensor 1440 may generate measurement signals in response to motion of augmented-reality system 1400 and may be located on substantially any portion of frame 1410. Sensor 1440 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1400 may or may not include sensor 1440 or may include more than one sensor. In embodiments in which sensor 1440 includes an IMU, the IMU may generate calibration data based on measurement signals from sensor 1440. Examples of sensor 1440 may include, without limitation, accelerometers, gyroscopes, magnetometers, other suitable types of sensors that detect motion, sensors used for error correction of the IMU, or some combination thereof.

In some examples, augmented-reality system 1400 may also include a microphone array with a plurality of acoustic transducers 1420(A)-1420(J), referred to collectively as acoustic transducers 1420. Acoustic transducers 1420 may represent transducers that detect air pressure variations induced by sound waves. Each acoustic transducer 1420 may be configured to detect sound and convert the detected sound into an electronic format (e.g., an analog or digital format). The microphone array in FIG. 15 may include, for example, ten acoustic transducers: 1420(A) and 1420(B), which may be designed to be placed inside a corresponding ear of the user, acoustic transducers 1420(C), 1420(D), 1420(E), 1420(F), 1420(G), and 1420(H), which may be positioned at various locations on frame 1410, and/or acoustic transducers 1420(1) and 1420(J), which may be positioned on a corresponding neckband 1405.

In some embodiments, one or more of acoustic transducers 1420(A)-(F) may be used as output transducers (e.g., speakers). For example, acoustic transducers 1420(A) and/or 1420(B) may be earbuds or any other suitable type of headphone or speaker.

The configuration of acoustic transducers 1420 of the microphone array may vary. While augmented-reality system 1400 is shown in FIG. 14 as having ten acoustic transducers 1420, the number of acoustic transducers 1420 may be greater or less than ten. In some embodiments, using higher numbers of acoustic transducers 1420 may increase the amount of audio information collected and/or the sensitivity and accuracy of the audio information. In contrast, using a lower number of acoustic transducers 1420 may decrease the computing power required by an associated controller 1450 to process the collected audio information. In addition, the position of each acoustic transducer 1420 of the microphone array may vary. For example, the position of an acoustic transducer 1420 may include a defined position on the user, a defined coordinate on frame 1410, an orientation associated with each acoustic transducer 1420, or some combination thereof.

Acoustic transducers 1420(A) and 1420(B) may be positioned on different parts of the user's ear, such as behind the pinna, behind the tragus, and/or within the auricle or fossa. Or, there may be additional acoustic transducers 1420 on or surrounding the ear in addition to acoustic transducers 1420 inside the ear canal. Having an acoustic transducer 1420 positioned next to an ear canal of a user may enable the microphone array to collect information on how sounds arrive at the ear canal. By positioning at least two of acoustic transducers 1420 on either side of a user's head (e.g., as binaural microphones), augmented-reality device 1400 may simulate binaural hearing and capture a 3D stereo sound field around about a user's head. In some embodiments, acoustic transducers 1420(A) and 1420(B) may be connected to augmented-reality system 1400 via a wired connection 1430, and in other embodiments acoustic transducers 1420(A) and 1420(B) may be connected to augmented-reality system 1400 via a wireless connection (e.g., a Bluetooth connection). In still other embodiments, acoustic transducers 1420(A) and 1420(B) may not be used at all in conjunction with augmented-reality system 1400.

Acoustic transducers 1420 on frame 1410 may be positioned in a variety of different ways, including along the length of the temples, across the bridge, above or below display devices 1415(A) and 1415(B), or some combination thereof. Acoustic transducers 1420 may also be oriented such that the microphone array is able to detect sounds in a wide range of directions surrounding the user wearing the augmented-reality system 1400. In some embodiments, an optimization process may be performed during manufacturing of augmented-reality system 1400 to determine relative positioning of each acoustic transducer 1420 in the microphone array.

In some examples, augmented-reality system 1400 may include or be connected to an external device (e.g., a paired device), such as neckband 1405. Neckband 1405 generally represents any type or form of paired device. Thus, the following discussion of neckband 1405 may also apply to various other paired devices, such as charging cases, smart watches, smart phones, wristbands, other wearable devices, hand-held controllers, tablet computers, laptop computers, other external compute devices, etc.

As shown, neckband 1405 may be coupled to eyewear device 1402 via one or more connectors. The connectors may be wired or wireless and may include electrical and/or non-electrical (e.g., structural) components. In some cases, eyewear device 1402 and neckband 1405 may operate independently without any wired or wireless connection between them. While FIG. 14 illustrates the components of eyewear device 1402 and neckband 1405 in example locations on eyewear device 1402 and neckband 1405, the components may be located elsewhere and/or distributed differently on eyewear device 1402 and/or neckband 1405. In some embodiments, the components of eyewear device 1402 and neckband 1405 may be located on one or more additional peripheral devices paired with eyewear device 1402, neckband 1405, or some combination thereof.

Pairing external devices, such as neckband 1405, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1400 may be provided by a paired device or shared between a paired device and an eyewear device, thus reducing the weight, heat profile, and form factor of the eyewear device overall while still retaining desired functionality. For example, neckband 1405 may allow components that would otherwise be included on an eyewear device to be included in neckband 1405 since users may tolerate a heavier weight load on their shoulders than they would tolerate on their heads. Neckband 1405 may also have a larger surface area over which to diffuse and disperse heat to the ambient environment. Thus, neckband 1405 may allow for greater battery and computation capacity than might otherwise have been possible on a stand-alone eyewear device. Since weight carried in neckband 1405 may be less invasive to a user than weight carried in eyewear device 1402, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1405 may be communicatively coupled with eyewear device 1402 and/or to other devices. These other devices may provide certain functions (e.g., tracking, localizing, depth mapping, processing, storage, etc.) to augmented-reality system 1400. In the embodiment of FIG. 14, neckband 1405 may include two acoustic transducers (e.g., 1420(1) and 1420(J)) that are part of the microphone array (or potentially form their own microphone subarray). Neckband 1405 may also include a controller 1425 and a power source 1435.

Acoustic transducers 1420(1) and 1420(J) of neckband 1405 may be configured to detect sound and convert the detected sound into an electronic format (analog or digital). In the embodiment of FIG. 14, acoustic transducers 1420(1) and 1420(J) may be positioned on neckband 1405, thereby increasing the distance between the neckband acoustic transducers 1420(1) and 1420(J) and other acoustic transducers 1420 positioned on eyewear device 1402. In some cases, increasing the distance between acoustic transducers 1420 of the microphone array may improve the accuracy of beamforming performed via the microphone array. For example, if a sound is detected by acoustic transducers 1420(C) and 1420(D) and the distance between acoustic transducers 1420(C) and 1420(D) is greater than, e.g., the distance between acoustic transducers 1420(D) and 1420(E), the determined source location of the detected sound may be more accurate than if the sound had been detected by acoustic transducers 1420(D) and 1420(E).

Controller 1425 of neckband 1405 may process information generated by the sensors on neckband 1405 and/or augmented-reality system 1400. For example, controller 1425 may process information from the microphone array that describes sounds detected by the microphone array. For each detected sound, controller 1425 may perform a direction-of-arrival (DOA) estimation to estimate a direction from which the detected sound arrived at the microphone array. As the microphone array detects sounds, controller 1425 may populate an audio data set with the information. In embodiments in which augmented-reality system 1400 includes an inertial measurement unit, controller 1425 may compute all inertial and spatial calculations from the IMU located on eyewear device 1402. A connector may convey information between augmented-reality system 1400 and neckband 1405 and between augmented-reality system 1400 and controller 1425. The information may be in the form of optical data, electrical data, wireless data, or any other transmittable data form. Moving the processing of information generated by augmented-reality system 1400 to neckband 1405 may reduce weight and heat in eyewear device 1402, making it more comfortable to the user.

Power source 1435 in neckband 1405 may provide power to eyewear device 1402 and/or to neckband 1405. Power source 1435 may include, without limitation, lithium ion batteries, lithium-polymer batteries, primary lithium batteries, alkaline batteries, or any other form of power storage. In some cases, power source 1435 may be a wired power source. Including power source 1435 on neckband 1405 instead of on eyewear device 1402 may help better distribute the weight and heat generated by power source 1435.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1500 in FIG. 15, that mostly or completely covers a user's field of view. Virtual-reality system 1500 may include a front rigid body 1502 and a band 1504 shaped to fit around a user's head. Virtual-reality system 1500 may also include output audio transducers 1506(A) and 1506(B). Furthermore, while not shown in FIG. 15, front rigid body 1502 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1400 and/or virtual-reality system 1500 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 1400 and/or virtual-reality system 1500 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1400 and/or virtual-reality system 1500 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices (such as systems 1400 and 1500 of FIGS. 14 and 15, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an augmented-reality headset or virtual-reality headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, an augmented-reality or virtual-reality headset may initiate a DOA analysis to determine the location of a sound source. The DOA analysis may include analyzing the intensity, spectra, and/or arrival time of each sound at the artificial-reality device to determine the direction from which the sounds originated. The DOA analysis may include any suitable algorithm for analyzing the surrounding acoustic environment in which the artificial-reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial-reality device may provide an alignment and orientation guide, which the user may follow to customize the sound signal presented to the user based on their unique HRTF. In some embodiments, an artificial-reality device may implement one or more microphones to listen to sounds within the user's environment. The augmented-reality or virtual-reality headset may use a variety of different array transfer functions (e.g., any of the DOA algorithms identified above) to estimate the direction of arrival for the sounds. Once the direction of arrival has been determined, the artificial-reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial-reality device may perform localization based on information received from other types of sensors. These sensors may include cameras, IR sensors, heat sensors, motion sensors, GPS receivers, or in some cases, sensors that detect a user's eye movements. For example, as noted above, an artificial-reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial-reality device may include one or more acoustic sensors that detect sounds within range of the device. A controller of the artificial-reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial-reality device may re-render (i.e., spatialize) the sound signals to sound as if coming from the direction of that sound source. The artificial-reality device may apply filters or other digital signal processing that alter the intensity, spectra, or arrival time of the sound signal. The digital signal processing may be applied in such a way that the sound signal is perceived as originating from the determined location. The artificial-reality device may amplify or subdue certain frequencies or change the time that the signal arrives at each ear. In some cases, the artificial-reality device may create an acoustic transfer function that is specific to the location of the device and the detected direction of arrival of the sound signal. In some embodiments, the artificial-reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial-reality device (or speakers associated with the device) may re-render an audio signal to sound as if originating from a specific location.

As noted, artificial-reality systems 1400 and 1500 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 16:
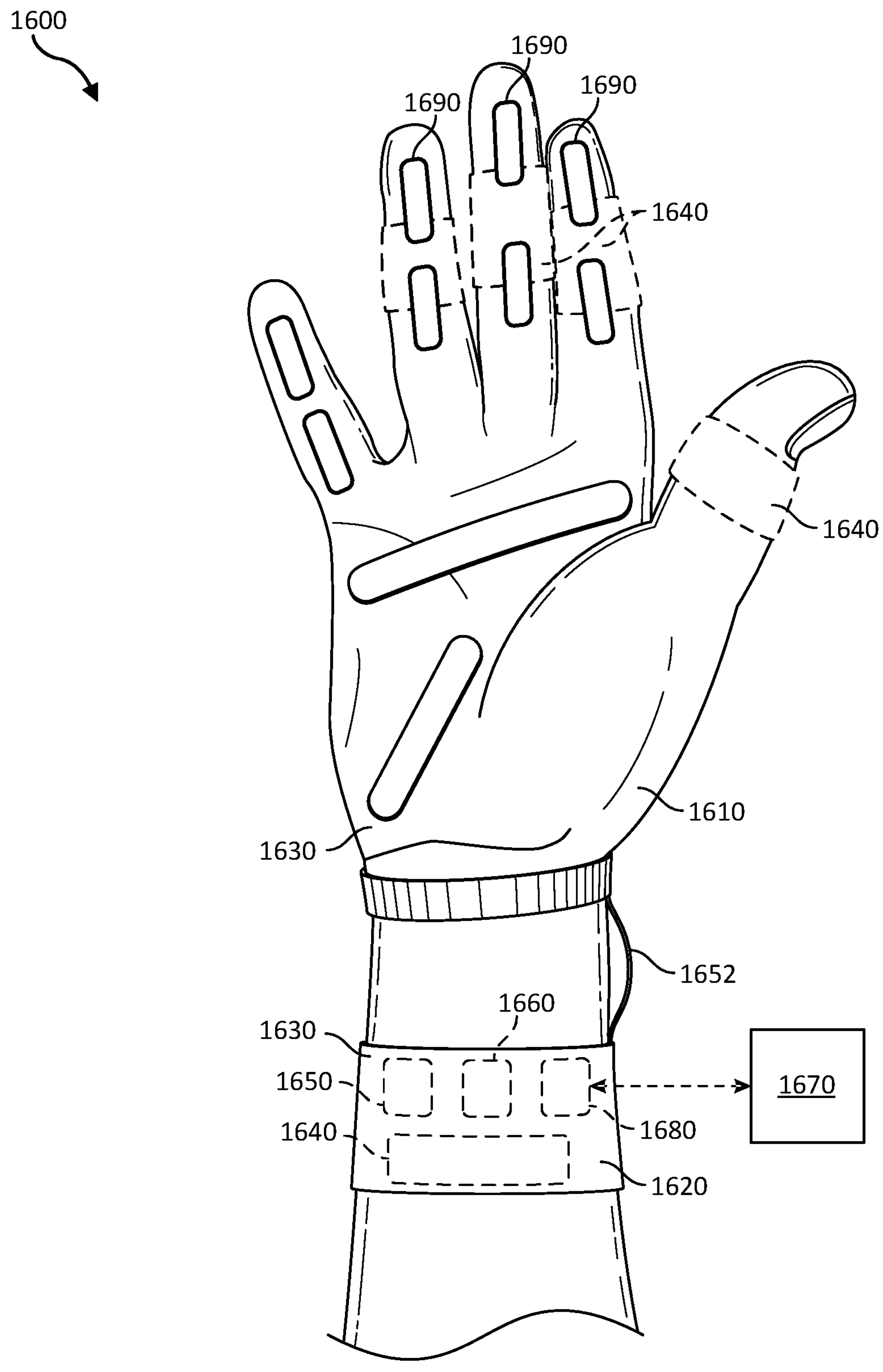
FIG. 16 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands (e.g., such as wristband systems 100 and 200, described above), etc.). As an example, FIG. 16 illustrates a vibrotactile system 1600 in the form of a wearable glove (haptic device 1610) and wristband (e.g., wristband system 100 of FIG. 1, haptic device 1620). Haptic device 1610 and haptic device 1620 are shown as examples of wearable devices that include a flexible, wearable textile material 1630 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a wristband, a watch band, a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1640 may be positioned at least partially within one or more corresponding pockets formed in textile material 1630 of vibrotactile system 1600. Vibrotactile devices 1640 may be positioned in locations to provide a vibrating sensation (e.g., haptic feedback) to a user of vibrotactile system 1600. For example, vibrotactile devices 1640 may be positioned against the user's finger(s), thumb, or wrist, as shown in FIG. 16. Vibrotactile devices 1640 may, in some examples, be sufficiently flexible to conform to or bend with the user's corresponding body part(s).

A power source 1650 for applying a voltage to the vibrotactile devices 1640 for activation thereof may be electrically coupled to vibrotactile devices 1640, such as via conductive wiring 1652. In some examples, each of vibrotactile devices 1640 may be independently electrically coupled to power source 1650 for individual activation. In some embodiments, a processor 1660 may be operatively coupled to power source 1650 and configured (e.g., programmed) to control activation of vibrotactile devices 1640.

Vibrotactile system 1600 may be implemented in a variety of ways. In some examples, vibrotactile system 1600 may be a standalone system with integral subsystems and components for operation independent of other devices and systems. As another example, vibrotactile system 1600 may be configured for interaction with another device or system 1670. For example, vibrotactile system 1600 may, in some examples, include a communications interface 1680 for receiving and/or sending signals to the other device or system 1670. The other device or system 1670 may be watch body 300, a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1680 may enable communications between vibrotactile system 1600 and the other device or system 1670 via a wireless link or a wired link. If present, communications interface 1680 may be in communication with processor 1660, such as to provide a signal to processor 1660 to activate or deactivate one or more of the vibrotactile devices 1640.

Vibrotactile system 1600 may optionally include other subsystems and components, such as touch-sensitive pads 1690, pressure sensors, motion sensors, position sensors, lighting elements, and/or user interface elements (e.g., an on/off button, a vibration control element, etc.). During use, vibrotactile devices 1640 may be configured to be activated for a variety of different reasons, such as in response to the user's interaction with user interface elements, a signal from the motion or position sensors, a signal from the touch-sensitive pads 1690, a signal from the pressure sensors, a signal from the other device or system 1670, etc.

Although power source 1650, processor 1660, and communications interface 1680 are illustrated in FIG. 16 as being positioned in haptic device 1620, the present disclosure is not so limited. For example, one or more of power source 1650, processor 1660, or communications interface 1680 may be positioned within haptic device 1610 or within another wearable textile.

Haptic wearables, such as those shown in and described in connection with FIG. 16, may be implemented in a variety of types of artificial-reality systems and environments. FIG. 17 shows an example artificial-reality environment 1700 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 1702 generally represents any type or form of virtual-reality system, such as virtual-reality system 1500 in FIG. 15. Haptic device 1704 generally represents any type or form of wearable device, worn by a user of an artificial-reality system, that provides haptic feedback to the user to give the user the perception that he or she is physically engaging with a virtual object. In some embodiments, haptic device 1704 may provide haptic feedback by applying vibration, motion, and/or force to the user. For example, haptic device 1704 may limit or augment a user's movement. To give a specific example, haptic device 1704 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1704 to send action requests to a console. Examples of action requests include, without limitation, requests to start an application and/or end the application and/or requests to perform a particular action within the application.

While haptic interfaces may be used with virtual-reality systems, as shown in FIG. 17, haptic interfaces may also be used with augmented-reality systems, as shown in FIG. 18. FIG. 18 is a perspective view of a user 1810 interacting with an augmented-reality system 1800. In this example, user 1810 may wear a pair of augmented-reality glasses 1820 that may have one or more displays 1822 and that are paired with a haptic device 1830. In this example, haptic device 1830 may be a wristband (e.g., such as wristband system 100 and wristband system 200 described above) that includes a plurality of band elements 1832 and a tensioning mechanism 1834 that connects band elements 1832 to one another.

One or more of band elements 1832 may include any type or form of actuator suitable for providing haptic feedback. For example, one or more of band elements 1832 may be configured to provide one or more of various types of cutaneous feedback, including vibration, force, traction, texture, and/or temperature. To provide such feedback, band elements 1832 may include one or more of various types of actuators. In one example, each of band elements 1832 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1610, 1620, 1704, and 1830 may include any suitable number and/or type of haptic transducer, sensor, and/or feedback mechanism. For example, haptic devices 1610, 1620, 1704, and 1830 may include one or more mechanical transducers, piezoelectric transducers, and/or fluidic transducers. Haptic devices 1610, 1620, 1704, and 1830 may also include various combinations of different types and forms of transducers that work together or independently to enhance a user's artificial-reality experience. In one example, each of band elements 1832 of haptic device 1830 may include a vibrotactor (e.g., a vibrotactile actuator) configured to vibrate in unison or independently to provide one or more of various types of haptic sensations to a user.

By way of non-limiting examples, the following embodiments are included in the present disclosure.

Example 1: A mobile electronic device may include a display, an enclosure supporting the display and comprising a conductive portion including at least one inward protrusion, and a ground plane positioned within the enclosure and comprising at least one channel, wherein the at least one inward protrusion extends within the at least one channel of the ground plane and a gap defined between the conductive portion of the enclosure and the ground plane forms a slot antenna that is configured to radiate electromagnetic signals through a portion of the display.

Example 2: The mobile electronic device of Example 1, wherein the gap extends along a perimeter of the conductive portion of the enclosure.

Example 3: The mobile electronic device of Example 1 or Example 2, further comprising a conductive cradle configured for removably mounting the enclosure, wherein the ground plane is electrically coupled to the conductive cradle to increase a gain of the slot antenna when the enclosure is mounted on the conductive cradle.

Example 4: The mobile electronic device of any of Examples 1 through 3, wherein the at least one inward protrusion comprises a plurality of inward protrusions and the at least one channel comprises a plurality of channels.

Example 5: The mobile electronic device of any of Examples 1 through 4, further comprising a printed circuit board, wherein the ground plane comprises a conductive layer of the printed circuit board.

Example 6: The mobile electronic device of any of Examples 1 through 5, wherein the gap comprises a non-conductive material disposed between the ground plane and the conductive portion of the enclosure.

Example 7: The mobile electronic device of any of Examples 1 through 6, wherein the gap defined between the conductive portion of the enclosure and the ground plane comprises a free space air gap having a width greater than or equal to about 1 mm.

Example 8: The mobile electronic device of any of Examples 1 through 7, wherein the slot antenna is configured to radiate with at least one frequency in a frequency band of about 600 MHz to about 2700 MHz.

Example 9: A system, comprising a watch body, a conductive watch cradle shaped and configured to support the watch body, a coupling mechanism configured to detachably couple the watch body to the conductive watch cradle, a ground plane disposed in the watch body, and at least one electrical contact that extends through a lower portion of the watch body, wherein the at least one electrical contact creates an electrical connection between the ground plane and the conductive watch cradle when the watch body is coupled to the conductive watch cradle.

Example 10: The system of Example 9, wherein the at least one electrical contact that extends though the lower portion of the watch body comprises a spring-loaded pin.

Example 11: The system of Example 9 or Example 10, wherein the at least one electrical contact comprises a plurality of electrical contacts positioned around a perimeter of the lower portion of the watch body, wherein the plurality of electrical contacts creates the electrical connection between the ground plane and the conductive watch cradle when the watch body is coupled to the conductive watch cradle.

Example 12: The system of any of Examples 9 through 11, further comprising at least one antenna in the watch body, the at least one antenna configured to radiate electromagnetic signals, a radio frequency transceiver in the watch body, and a dynamic tuner operably coupled to the radio frequency transceiver and the ground plane, wherein the radio frequency transceiver is configured to control the dynamic tuner to adjust a center frequency of the at least one antenna based on at least a proximity of the watch body to the conductive watch cradle.

Example 13: The system of any of Examples 9 through 12, wherein the watch body comprises a conductive portion including at least one inward protrusion the ground plane comprises at least one channel the at least one inward protrusion extends within the at least one channel of the ground plane, and a gap defined between the conductive portion of the watch body and the ground plane forms a slot antenna that is configured to radiate electromagnetic signals.

Example 14: A system, comprising a watch body comprising an outer conductive ring and housing a ground plane that is electrically coupled to the outer conductive ring a conductive watch cradle shaped and configured to support the watch body, and a coupling mechanism configured to detachably couple the watch body to the conductive watch cradle, wherein the outer conductive ring is capacitively coupled to the conductive watch cradle when the watch body is coupled to the conductive watch cradle.

Example 15: The system of Example 14, wherein the outer conductive ring is disposed on a lower portion of the watch body adjacent to the conductive watch cradle when the watch body is coupled to the conductive watch cradle.

Example 16: The system of Example 14 or Example 15, wherein the outer conductive ring comprises at least one of copper, aluminum, gold, or a metal alloy.

Example 17: The system of any of Examples 14 through 16, further comprising, when the watch body is coupled to the conductive watch cradle, a gap between the outer conductive ring and the conductive watch cradle of about 200 microns to about 500 microns.

Example 18: The system of any of Examples 14 through 17, wherein the outer conductive ring comprises a cosmetic surface coating.

Example 19: The system of any of Examples 14 through 18, wherein the ground plane is electrically coupled to the outer conductive ring through a spring-loaded pin.

Example 20: The system of any of Examples 14 through 19, wherein the watch body further comprises at least one through hole comprising a conductive material that electrically connects the outer conductive ring to the spring-loaded pin.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A mobile electronic device, comprising:

a display;

an enclosure supporting the display and comprising a conductive portion including an inward protrusion having at least two opposite sides; and a ground plane positioned within the enclosure and comprising a channel, wherein:

the inward protrusion extends into the channel of the ground plane such that the at least two opposite sides of the inward protrusion are placed adjacent to corresponding sides of the channel of the ground plane; and a gap defined between the conductive portion of the enclosure and the ground plane forms a slot antenna that is configured to radiate electromagnetic signals through a portion of the display.

2. The mobile electronic device of claim 1, wherein the at least two opposite sides of the inward protrusion are aligned in parallel.

3. The mobile electronic device of claim 1, further comprising a conductive cradle configured for removably mounting the enclosure, wherein the ground plane is electrically coupled to the conductive cradle to increase a gain of the slot antenna when the enclosure is mounted on the conductive cradle.

4. The mobile electronic device of claim 1, further comprising:

a plurality of inward protrusions, the inward protrusion forming a part of the plurality of inward protrusions; and a plurality of channels, the channel forming a part of the plurality of channels.

5. The mobile electronic device of claim 1, further comprising a printed circuit board, wherein the ground plane comprises a conductive layer of the printed circuit board.

6. The mobile electronic device of claim 1, wherein the gap comprises a non-conductive material disposed between the ground plane and the conductive portion of the enclosure.

7. The mobile electronic device of claim 1, wherein the gap defined between the conductive portion of the enclosure and the ground plane comprises a free space air gap having a width greater than or equal to about 1 mm.

8. The mobile electronic device of claim 1, wherein the slot antenna is configured to radiate with at least one frequency in a frequency band of about 600 MHz to about 2700 MHz.

9. A system, comprising:
a watch body;
a conductive watch cradle shaped and configured to support the watch body;
a coupling mechanism configured to detachably couple the watch body to the conductive watch cradle;
a ground plane disposed in the watch body; and
at least one electrical contact that extends through a lower portion of the watch body, wherein the at least one electrical contact creates an electrical connection between the ground plane and the conductive watch cradle when the watch body is coupled to the conductive watch cradle, wherein:
the watch body comprises a conductive portion including an inward protrusion having at least two opposite sides;
the ground plane comprises a channel;
the inward protrusion extends into the channel of the ground plane such that the at least two opposite sides of the inward protrusion are placed adjacent to corresponding sides of the channel of the ground plane; and
a gap defined between the conductive portion of the watch body and the ground plane forms a slot antenna that is configured to radiate electromagnetic signals.

10. The system of claim 9, wherein the at least one electrical contact that extends though the lower portion of the watch body comprises a spring-loaded pin.

11. The system of claim 9, wherein the at least one electrical contact comprises a plurality of electrical contacts positioned around a perimeter of the lower portion of the watch body, wherein the plurality of electrical contacts creates the electrical connection between the ground plane and the conductive watch cradle when the watch body is coupled to the conductive watch cradle.

12. The system of claim 9, further comprising:
a radio frequency transceiver in the watch body; and
a dynamic tuner operably coupled to the radio frequency transceiver and the ground plane, wherein the radio frequency transceiver is configured to control the dynamic tuner to adjust a center frequency of the slot antenna based on at least a proximity of the watch body to the conductive watch cradle.

13. The system of claim 9, wherein the at least two opposite sides of the inward protrusion are aligned in parallel.

14. A system, comprising:
a watch body comprising an outer conductive ring and housing a ground plane that is electrically coupled to the outer conductive ring;
a conductive watch cradle shaped and configured to support the watch body; and
a coupling mechanism configured to detachably couple the watch body to the conductive watch cradle, wherein:
the outer conductive ring is capacitively coupled to the conductive watch cradle when the watch body is coupled to the conductive watch cradle;
the outer conductive ring comprises an inward protrusion having at least two opposite sides;
the ground plane comprises a channel;
the inward protrusion extends into the channel of the ground plane such that the at least two opposite sides of the inward protrusion are placed adjacent to corresponding sides of the channel of the ground plane; and
a gap defined between the outer conductive ring of the watch body and the ground plane forms a slot antenna that is configured to radiate electromagnetic signals.

15. The system of claim 14, wherein the outer conductive ring is disposed on a lower portion of the watch body adjacent to the conductive watch cradle when the watch body is coupled to the conductive watch cradle.

16. The system of claim 14, wherein the outer conductive ring comprises at least one of copper, aluminum, gold, or a metal alloy.

17. The system of claim 14, further comprising, when the watch body is coupled to the conductive watch cradle, an additional gap between the outer conductive ring and the conductive watch cradle of about 200 microns to about 500 microns.

18. The system of claim 14, wherein the outer conductive ring comprises a cosmetic surface coating.

19. The system of claim 14, wherein the ground plane is electrically coupled to the outer conductive ring through a spring-loaded pin.

20. The system of claim 19, wherein the watch body further comprises at least one through hole comprising a conductive material that electrically connects the outer conductive ring to the spring-loaded pin.

* * * * *